Sept. 4, 1956 R. N. SABEE ET AL 2,761,676
SHEET INTER-FOLDING AND ASSOCIATING MACHINE
Filed Sept. 11, 1952 21 Sheets-Sheet 1
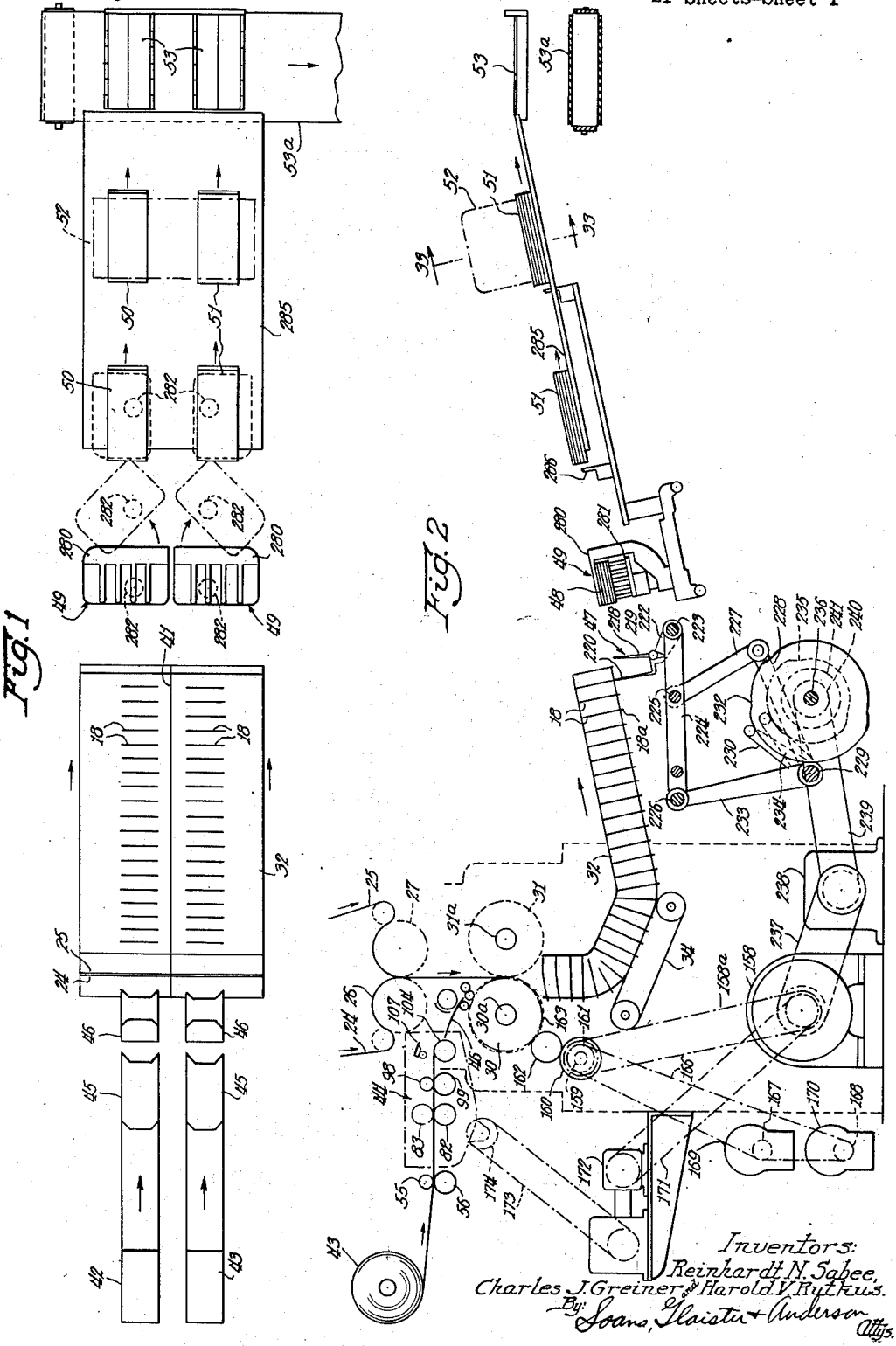
Inventors:
Reinhardt N. Sabee,
Charles J. Greiner, & Harold V. Rutkus.
By: Soans, Glaister + Anderson
Attys.

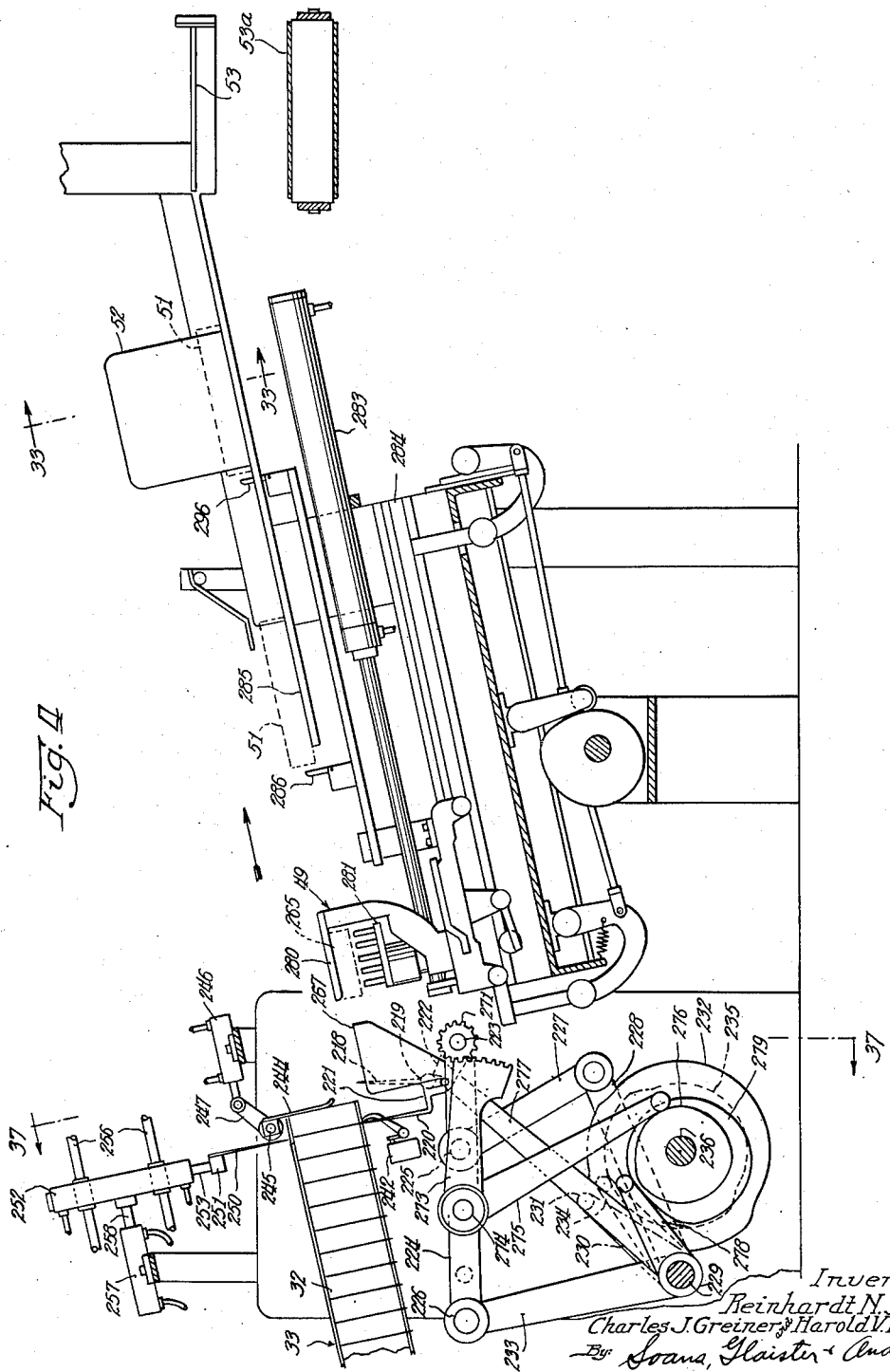

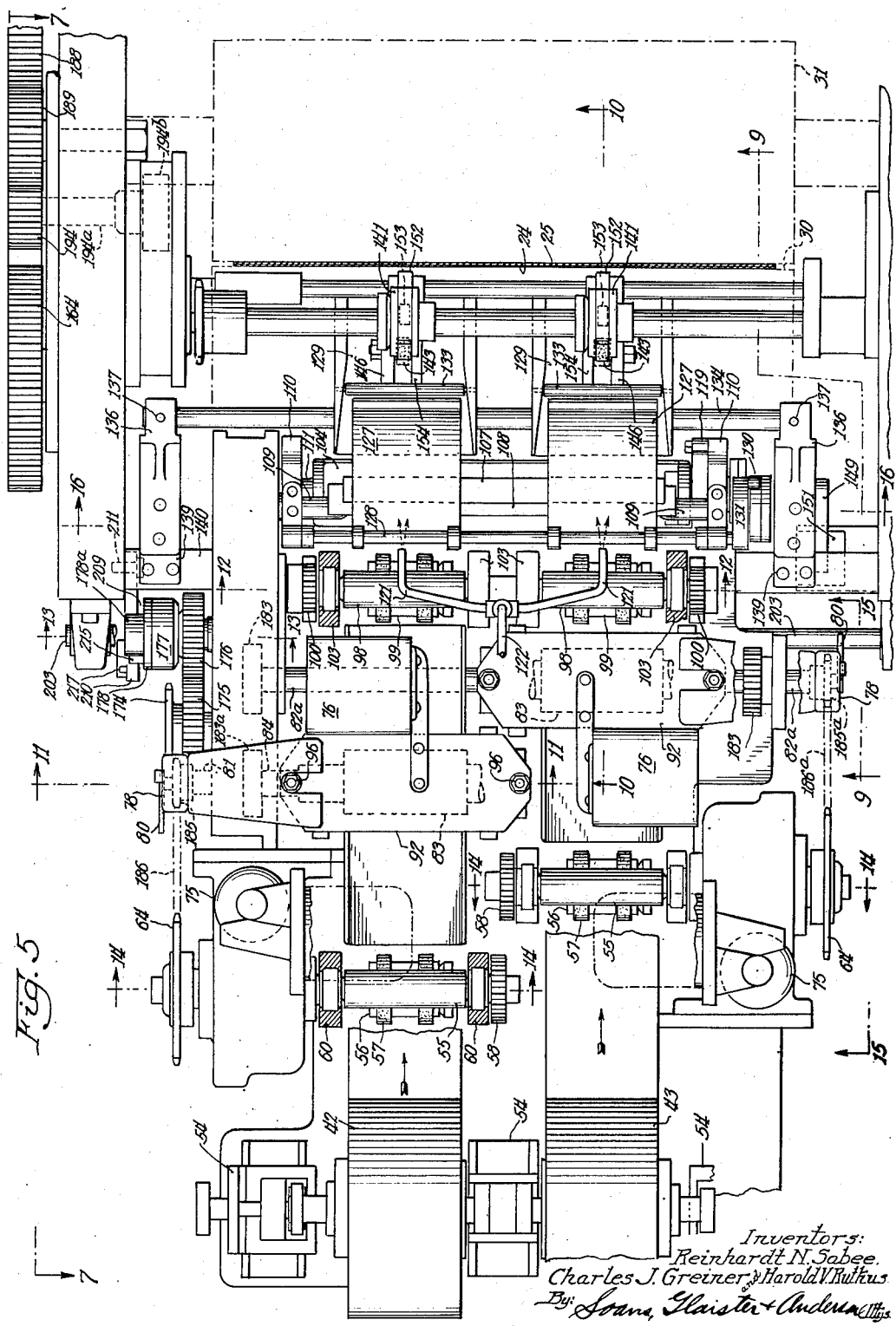

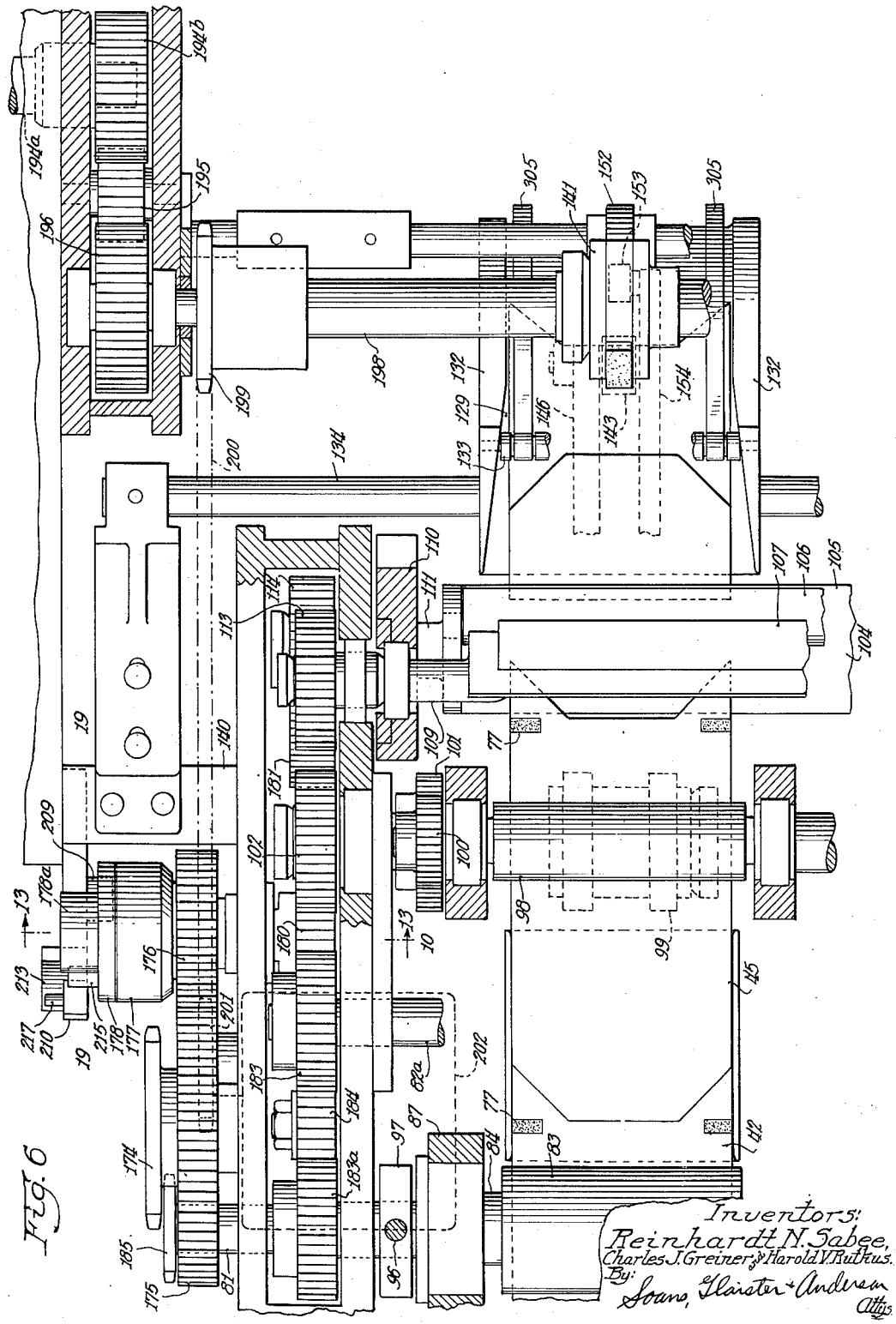

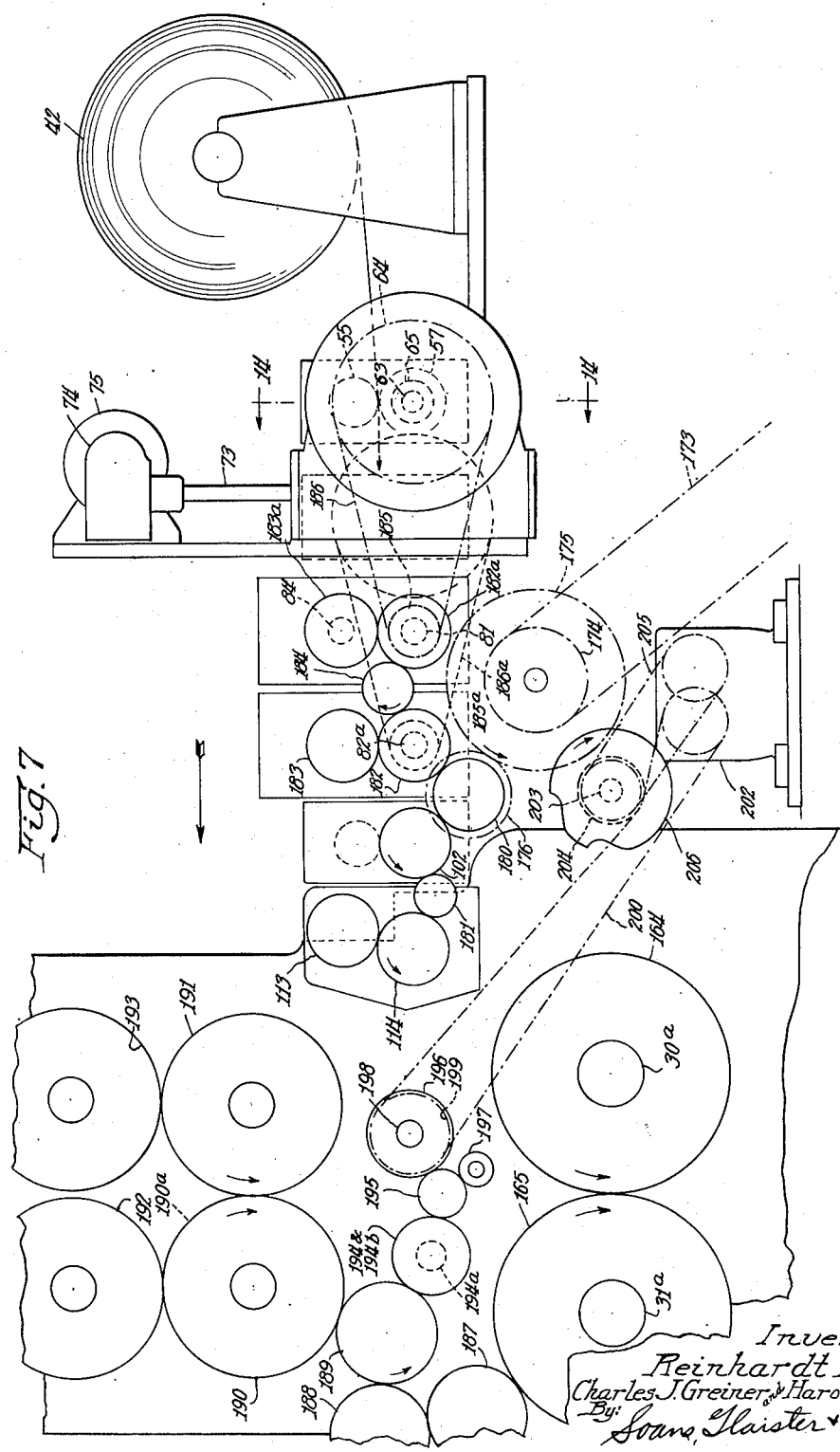

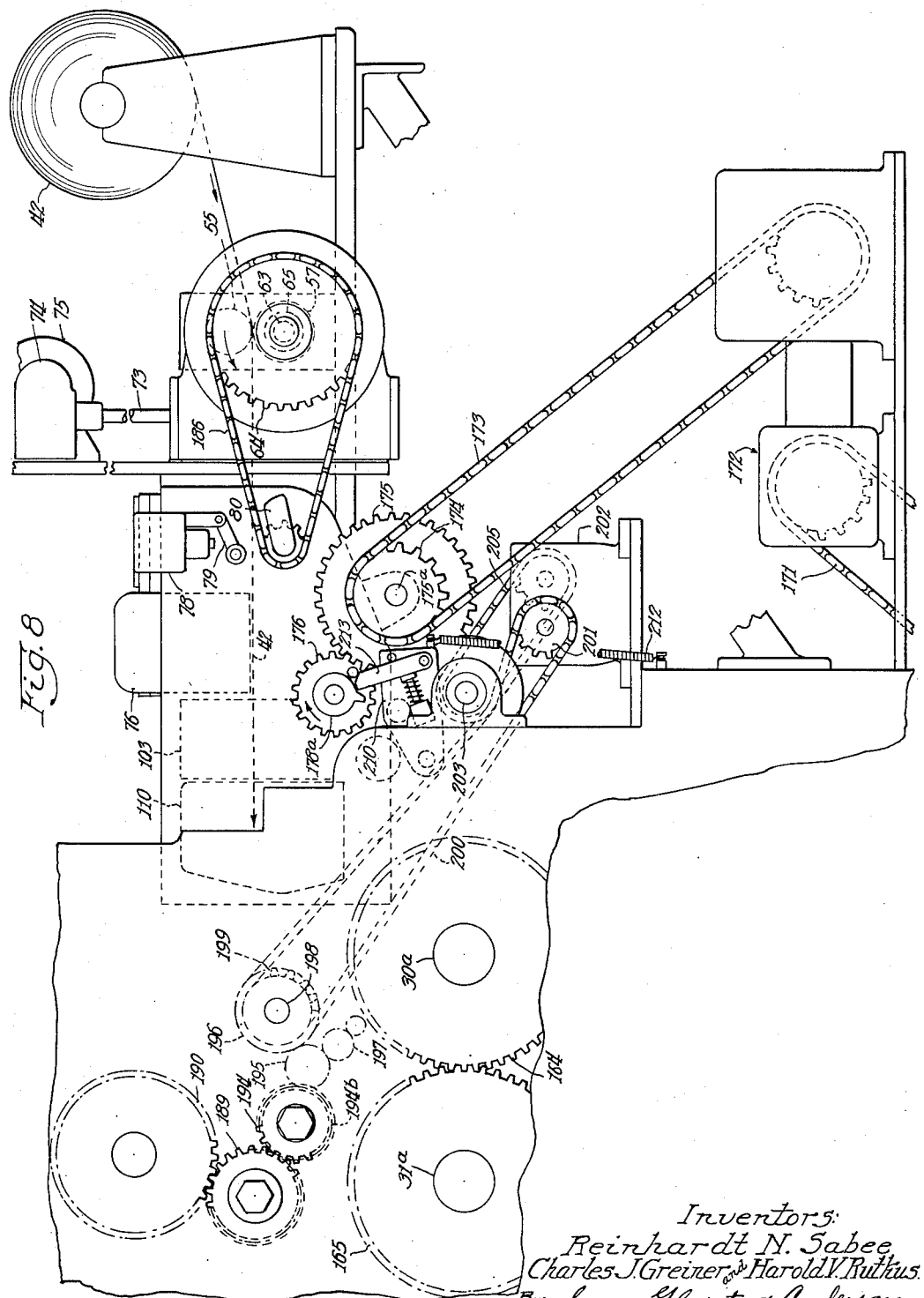

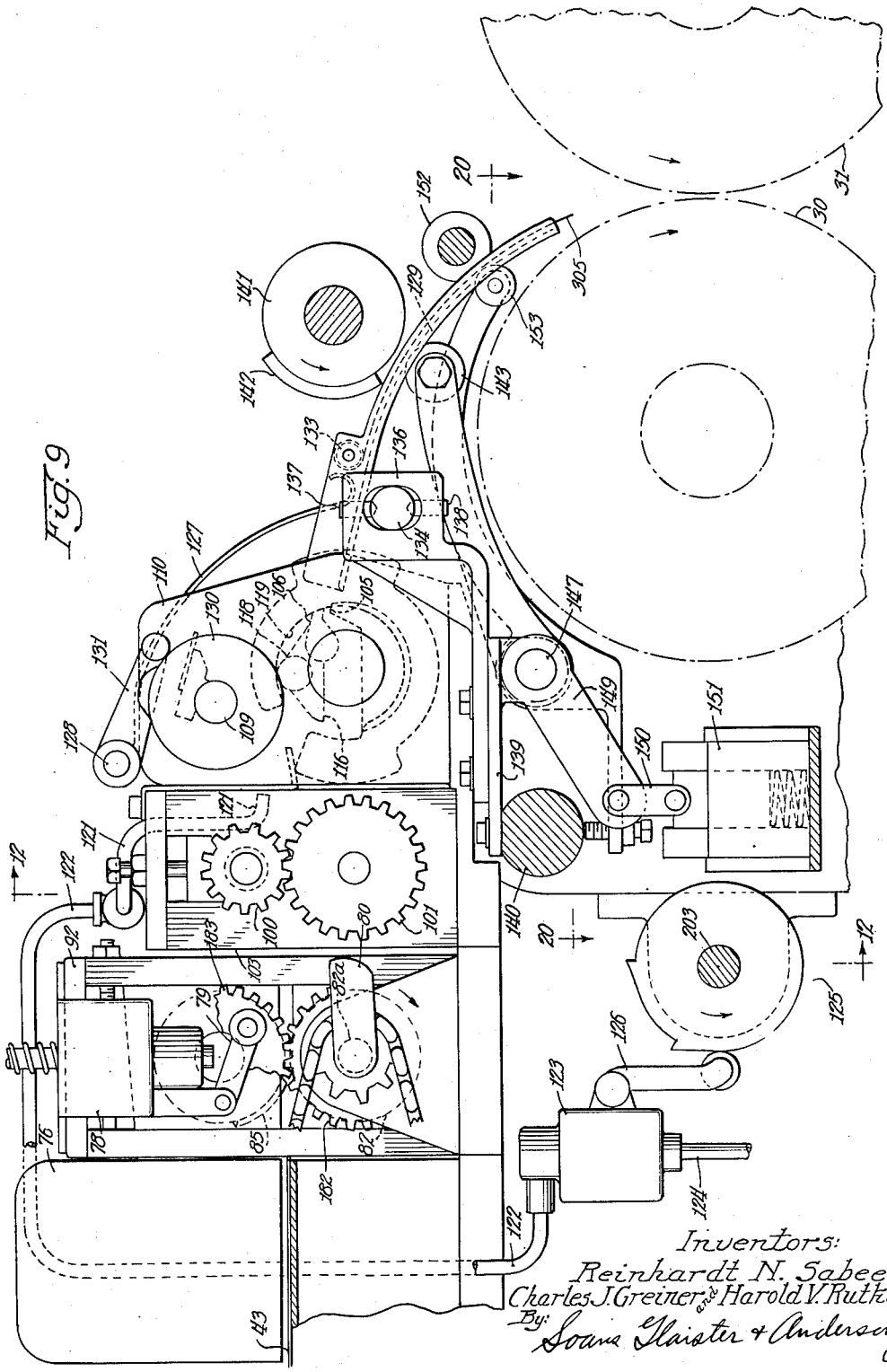

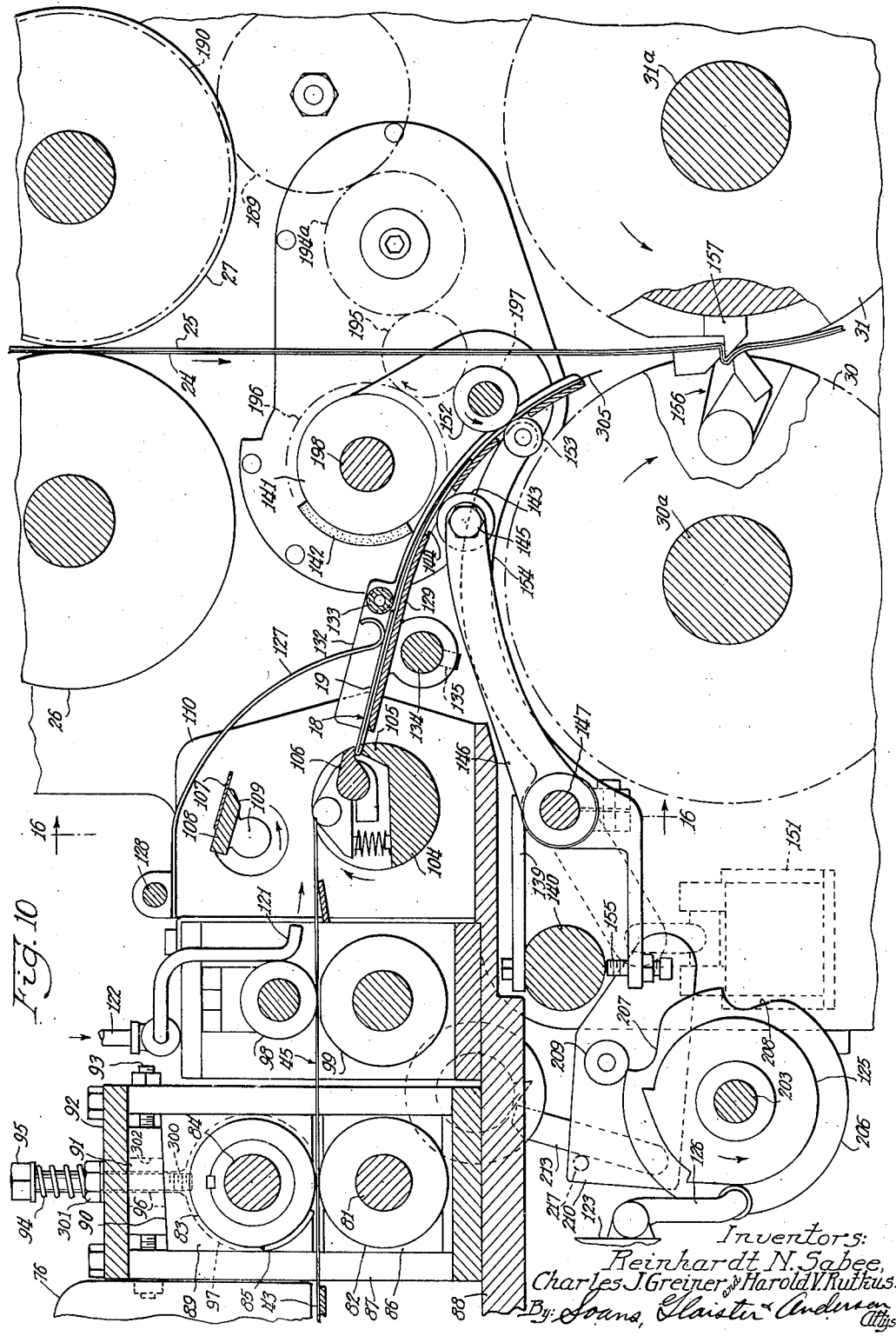

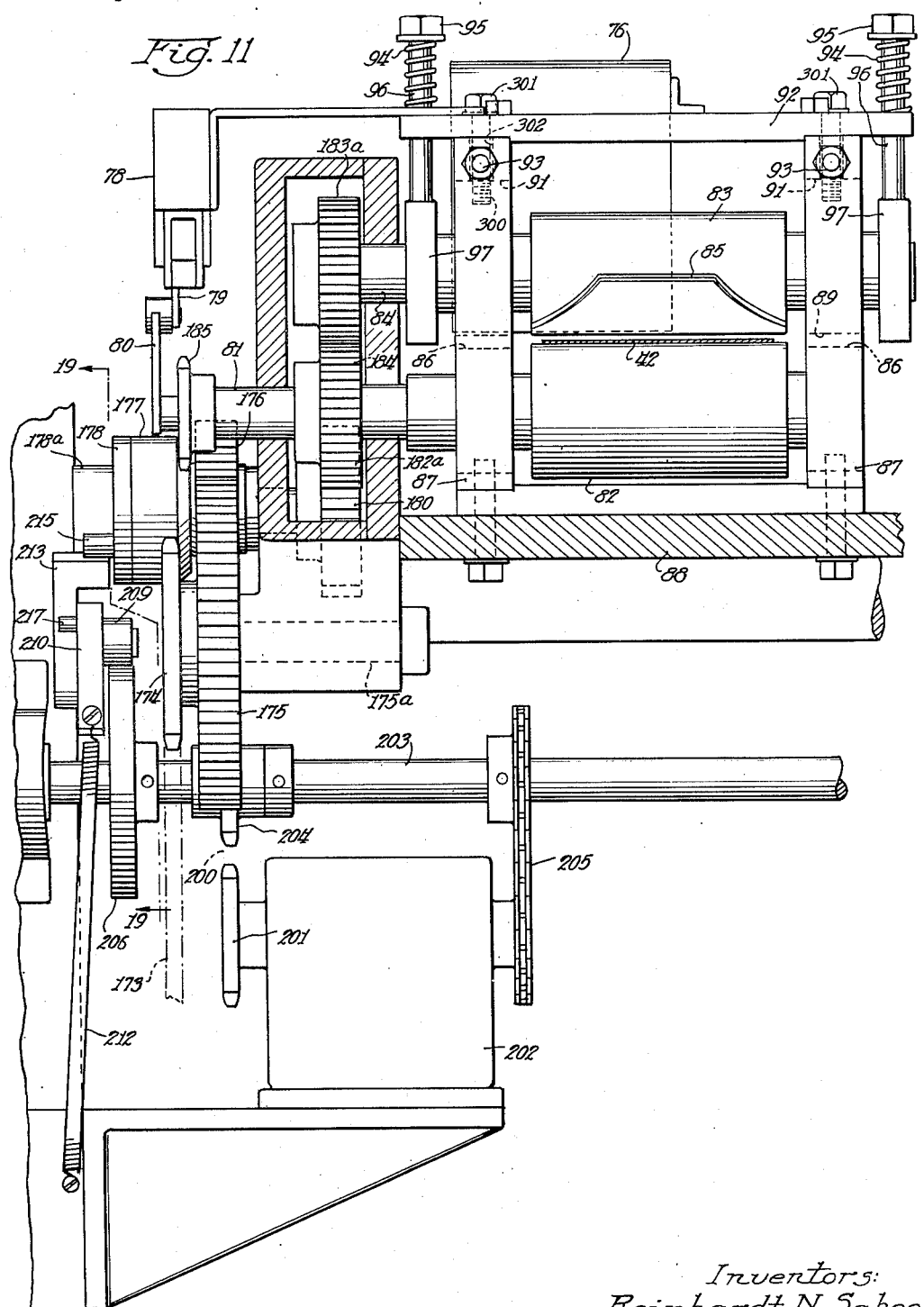

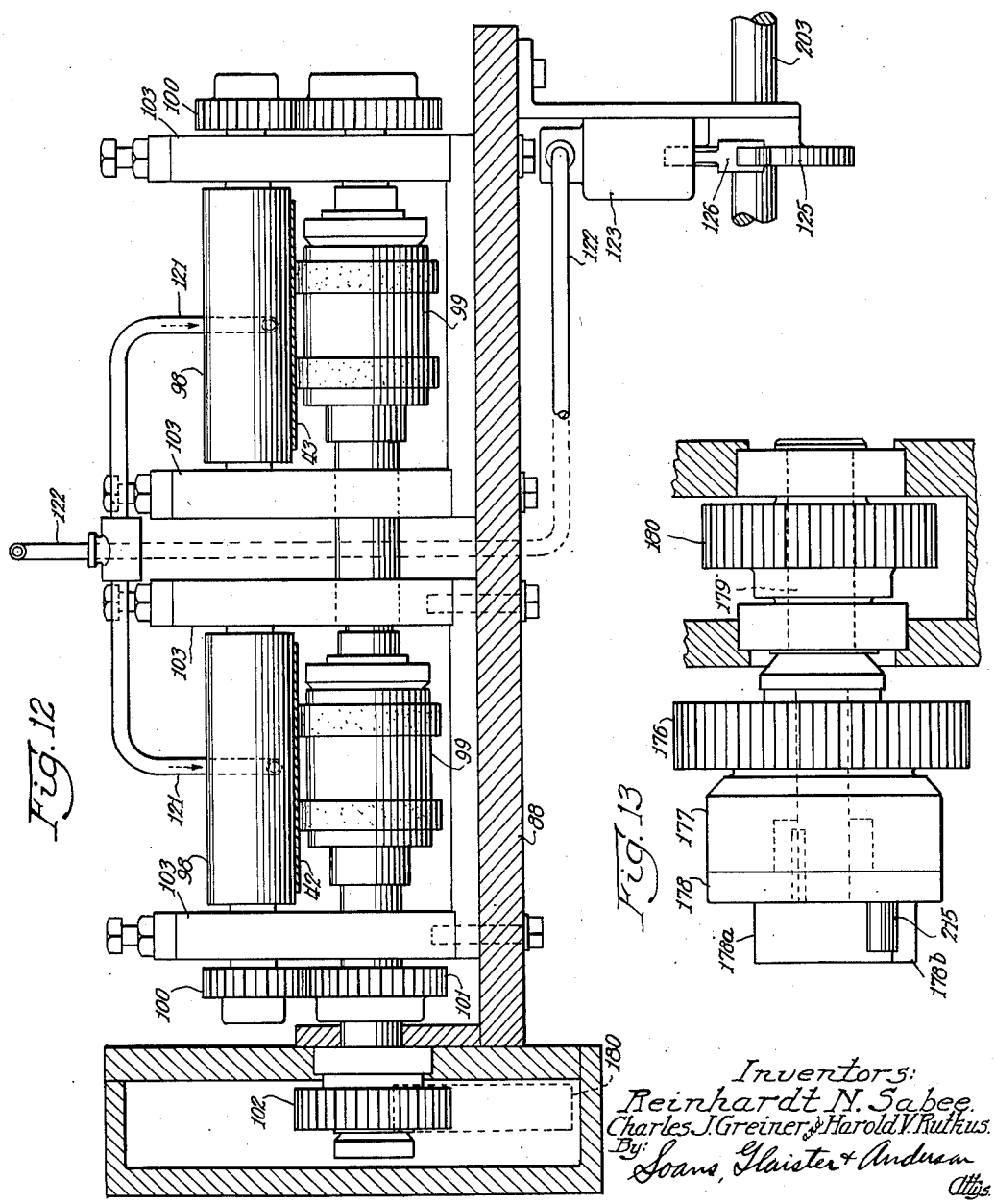

Sept. 4, 1956  R. N. SABEE ET AL  2,761,676
SHEET INTER-FOLDING AND ASSOCIATING MACHINE
Filed Sept. 11, 1952  21 Sheets-Sheet 12

Inventors:
Reinhardt N. Sabee,
Charles J. Greiner, & Harold V. Ruthus.
By: Soans, Glaister + Anderson
Attys.

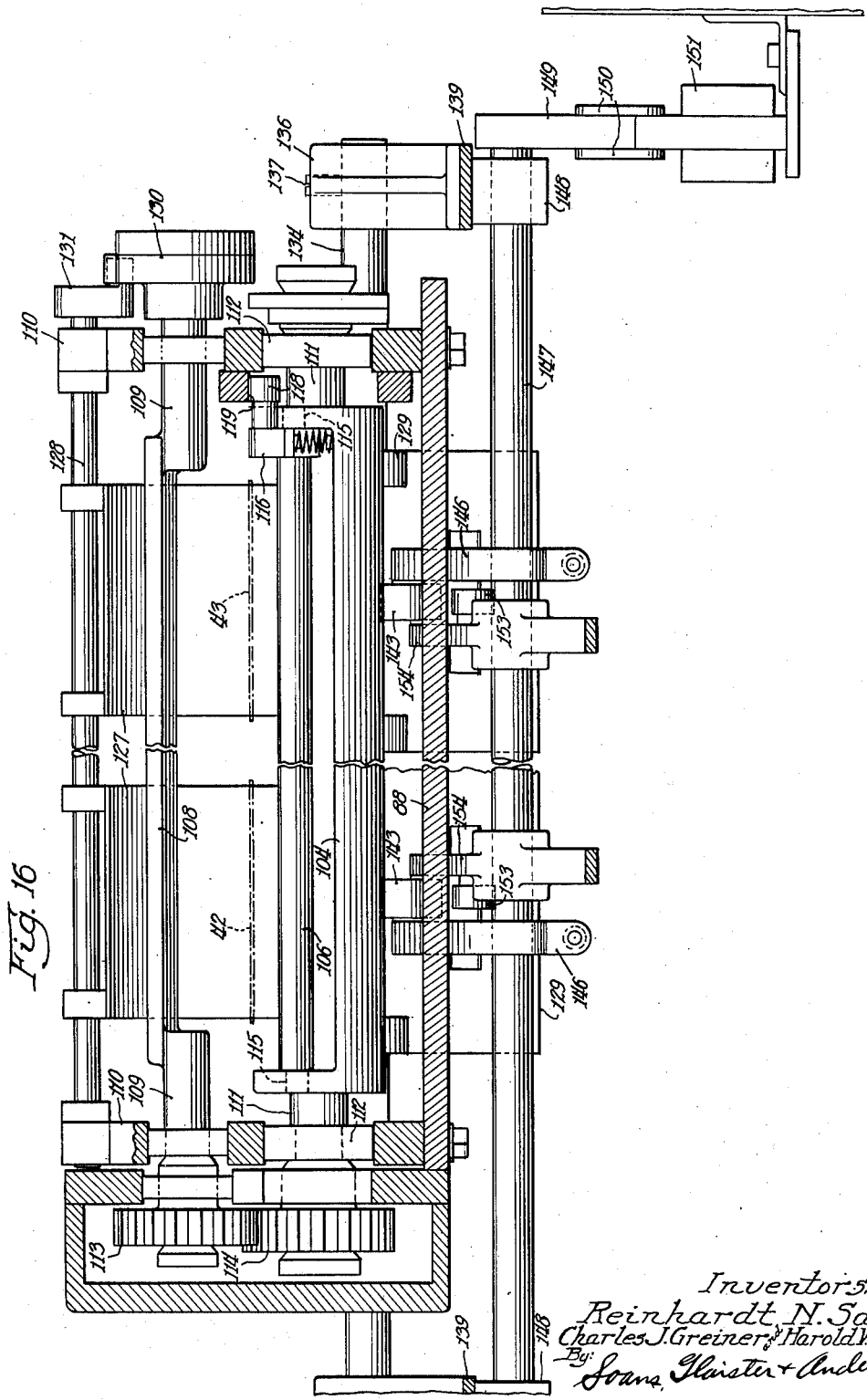

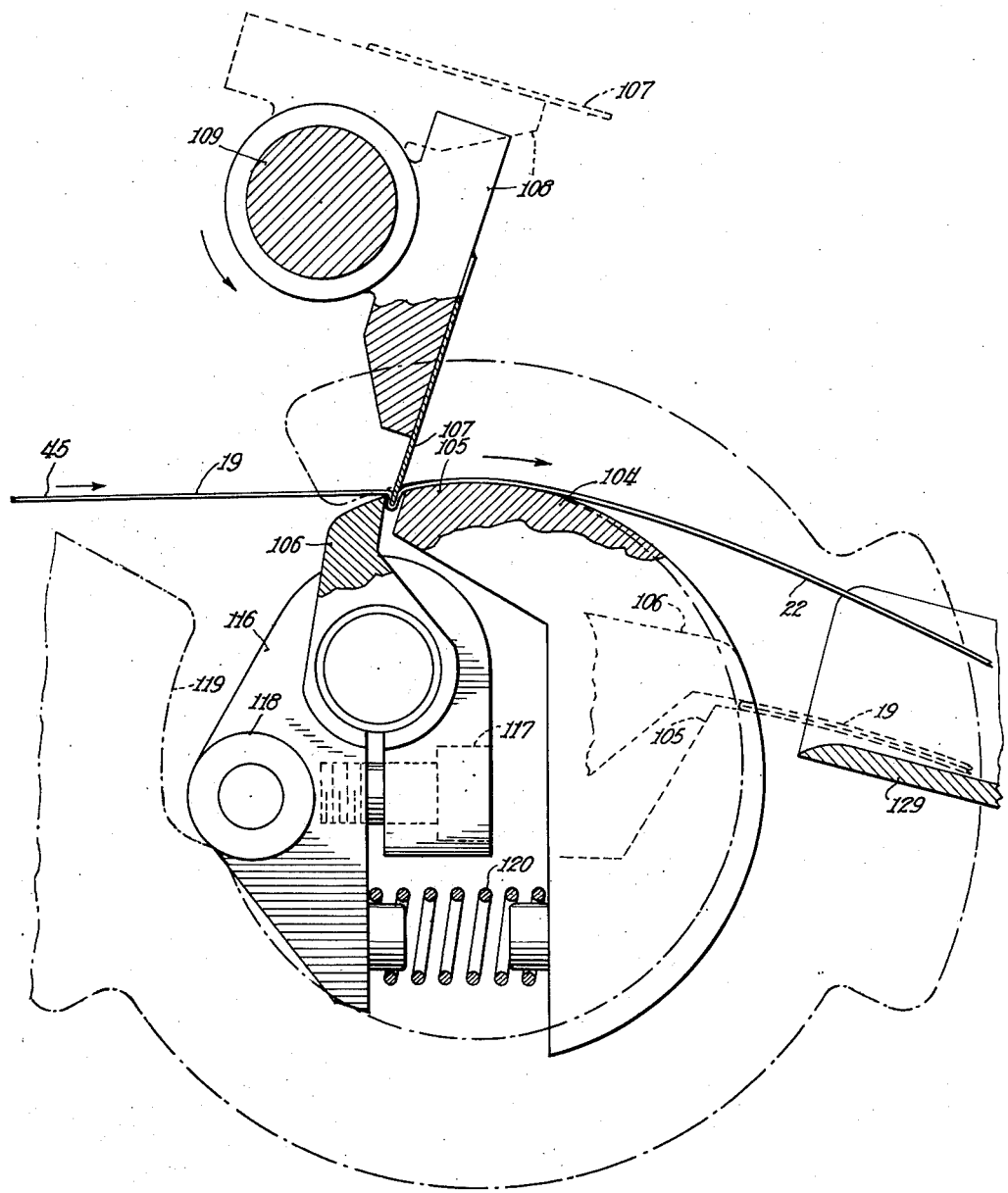

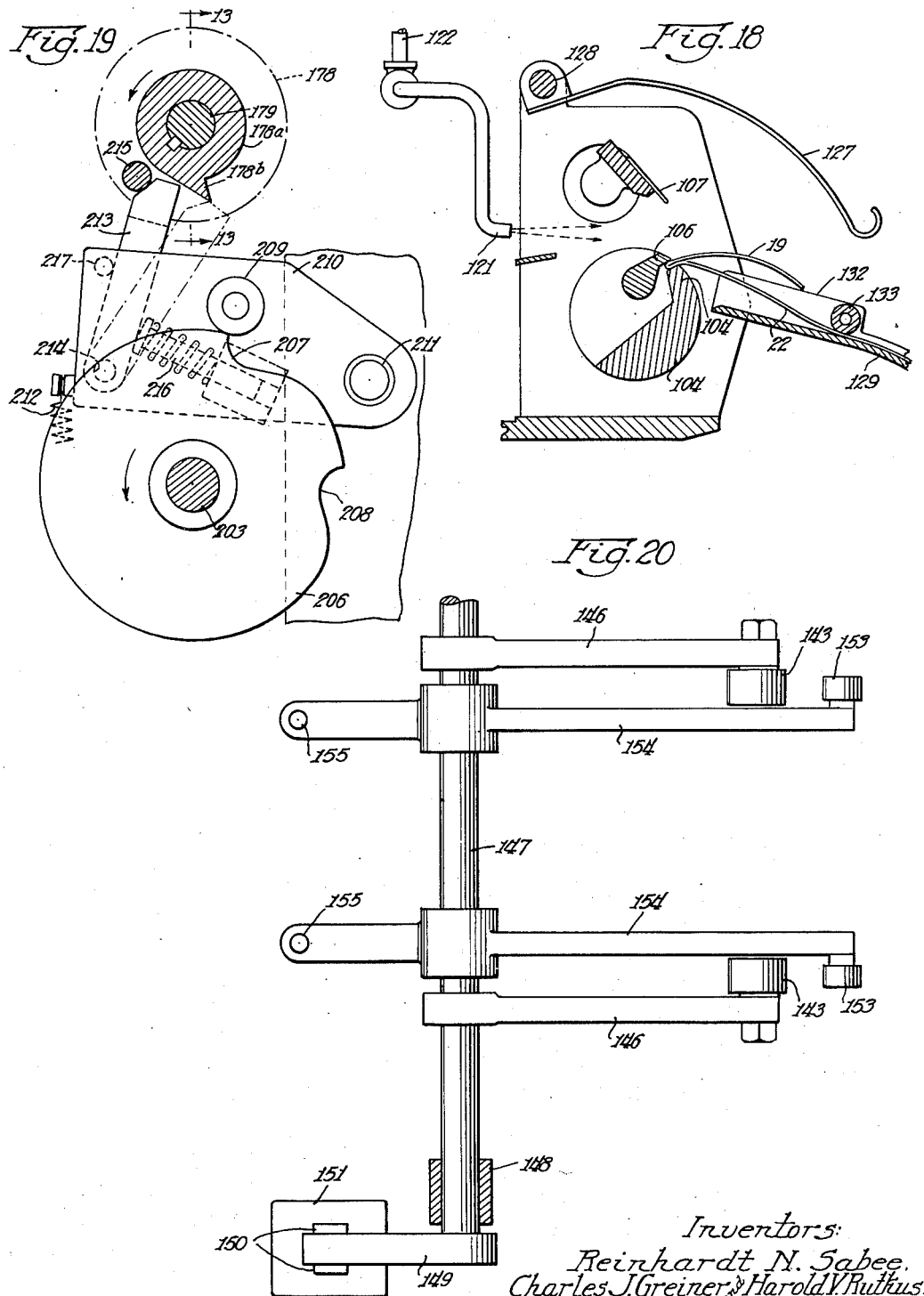

Sept. 4, 1956 R. N. SABEE ET AL 2,761,676
SHEET INTER-FOLDING AND ASSOCIATING MACHINE
Filed Sept. 11, 1952 21 Sheets-Sheet 16
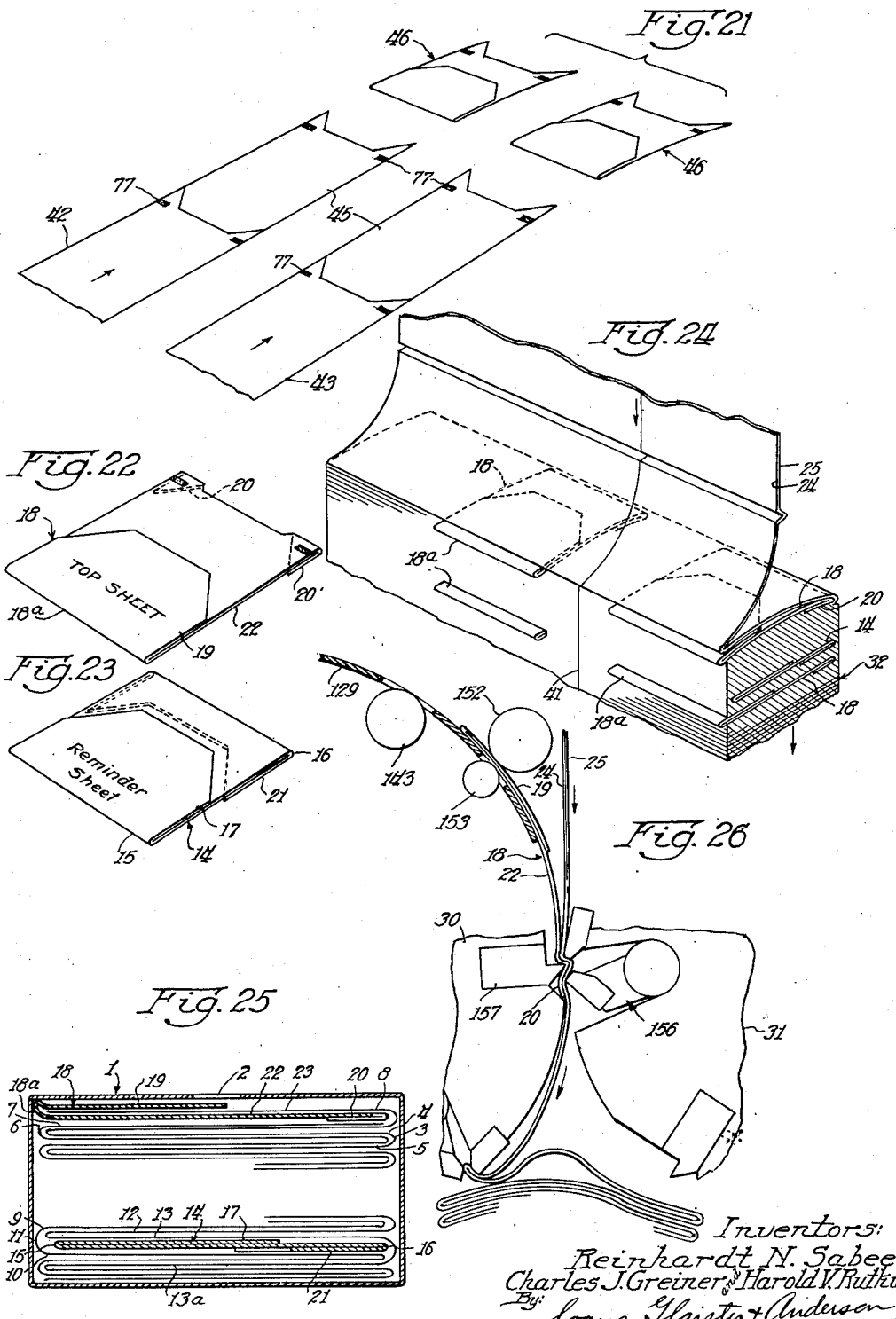

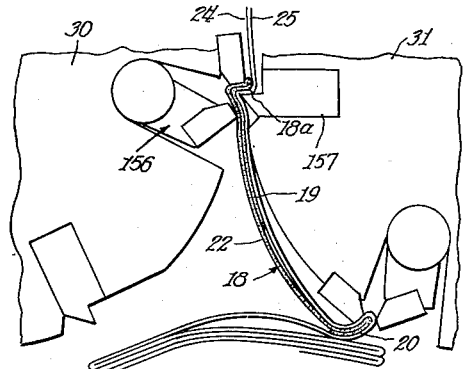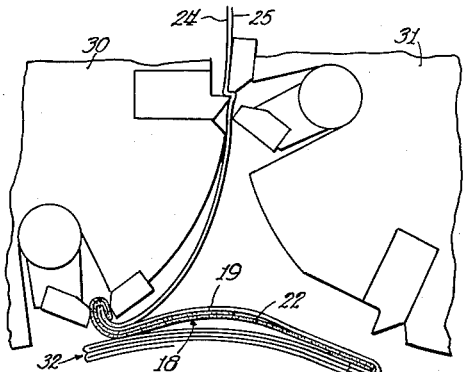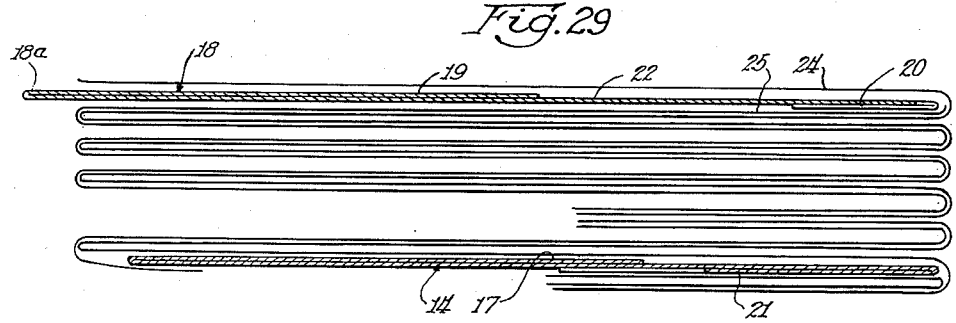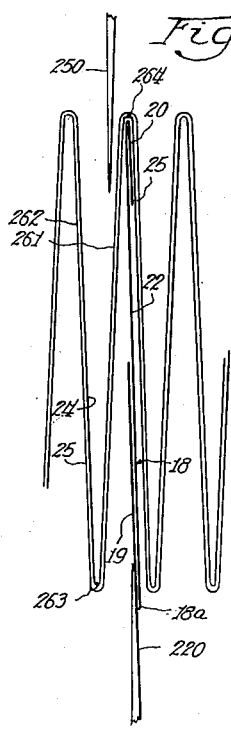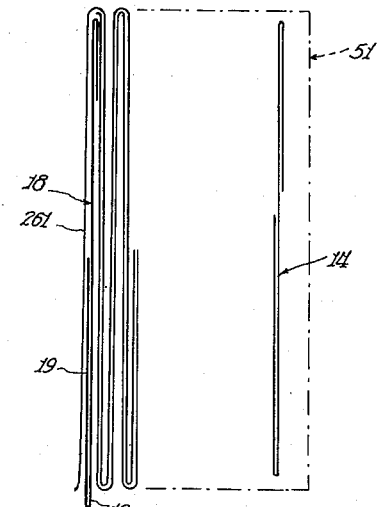

Sept. 4, 1956  R. N. SABEE ET AL  2,761,676
SHEET INTER-FOLDING AND ASSOCIATING MACHINE
Filed Sept. 11, 1952  21 Sheets-Sheet 18
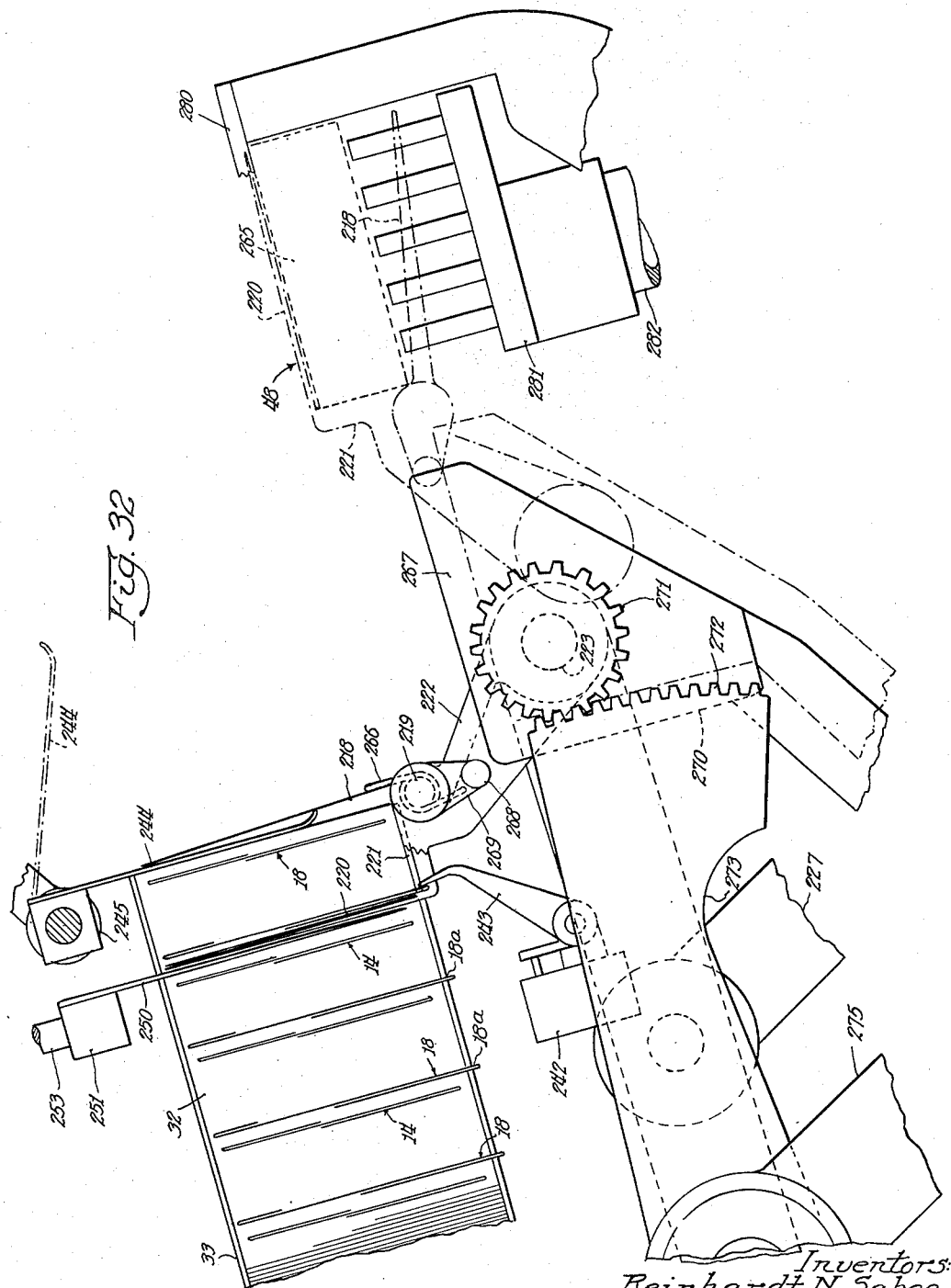

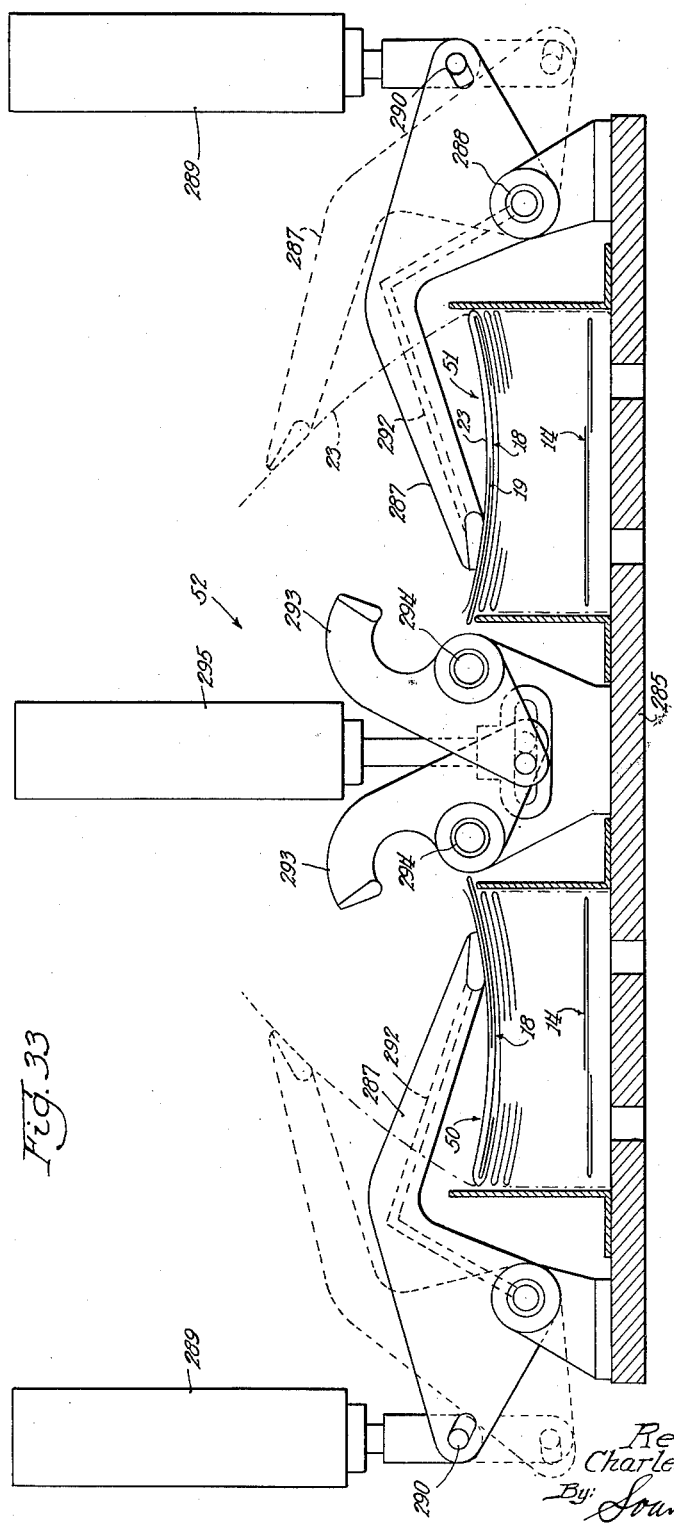

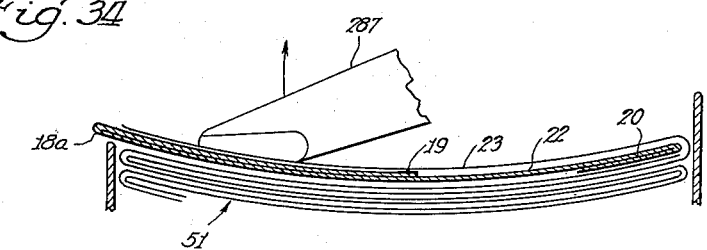
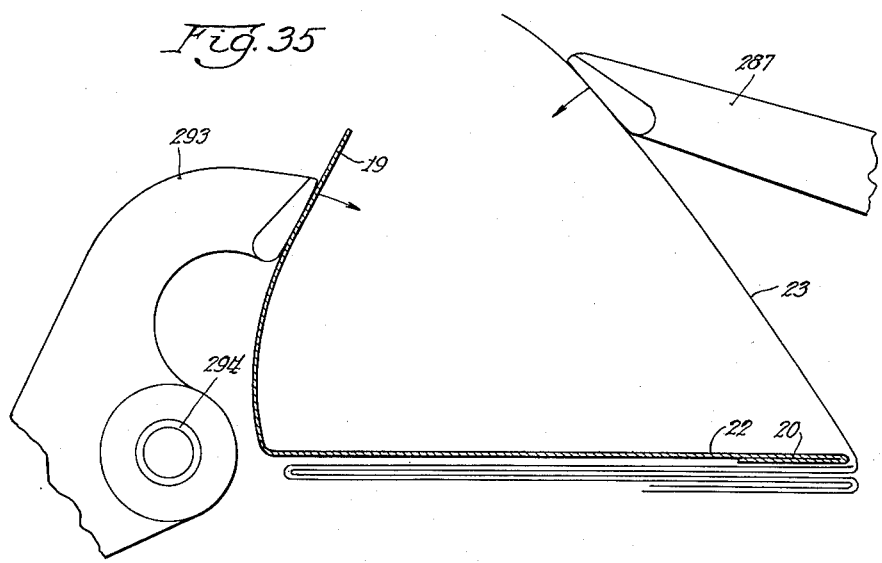
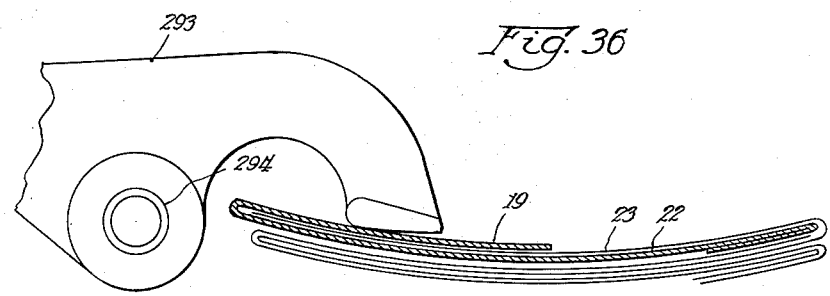

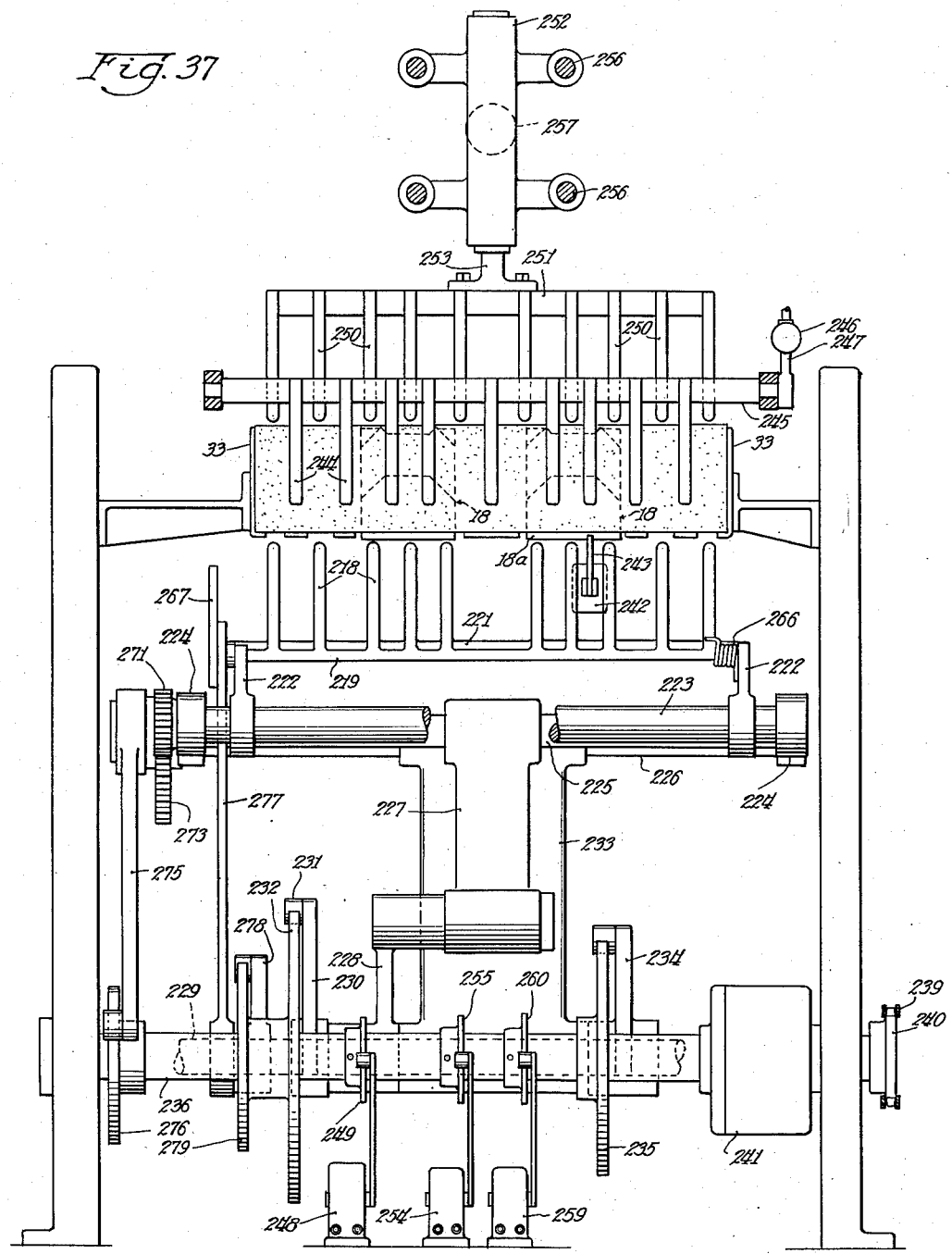

United States Patent Office 2,761,676
Patented Sept. 4, 1956

2,761,676

SHEET INTER-FOLDING AND ASSOCIATING MACHINE

Reinhardt Nils Sabee, Appleton, Harold Vincent Rutkus, Neenah, and Charles James Greiner, Menasha, Wis., assignors, by mesne assignments, to Kimberly-Clark Corporation, a corporation of Delaware Application September 11, 1952, Serial No. 308,996

18 Claims. (Cl. 270—39)

This invention relates to machines of the type employed for folding facial tissues, paper towels, toilet tissues and similar materials. Such tissues, and similar paper goods, are often interfolded with each folded sheet embracing a fold of each of the two adjacent sheets to facilitate withdrawal of each succeeding sheet from a box or the like containing a pack of the tissues. Further, for sanitary purposes and convenience in vending the sheets one by one, the interfolded sheets are enclosed in a box or other package having in its top wall a relatively narrow slot extending across most of the length of the box. Consequently, access to the stack of tissues within the box is rather difficult and usually necessitates the incorporation of a special starter or pull-out sheet which will have a free edge located within the area of the dispensing slot of the box. The free edge of this special pull-out sheet can be readily gripped to initiate the vending of sheets one by one from the box. Such starter sheets have been manually put in place in the stack of folded tissues or the like.

The present invention is concerned with equipment for automatically incorporating starter sheets in packs or clips of folded sheets. The invention is also concerned with the provision of sheet inserting mechanism which will insert sheets of special or different paper than the tissues or other paper to be vended at spaced intervals for the purpose of marking off a predetermined number of sheets, and which inserting mechanism may also be employed for inserting in the packs, reminder leaflets or advertising leaflets, such reminder or advertising leaflets being inserted at a different location than the starter sheets.

The main objects of the present invention may therefore be said to be those of providing folding apparatus with mechanism for automatically inserting starter or pull-out sheets, advertising or reminder sheets, and so forth, in predetermined places in each group or clip of sheets which are to form a package; to provide sheet inserting mechanism which can be opened to alternately insert two different insert sheets and which is operable to effect different application of the alternately inserted sheets so as to place one such sheet wholly within the normal confines of the pack while the other is so treated and placed as to project slightly beyond a wall of the pack to provide a marker to designate groups or pack units of folded sheets for separation from each other for individual packaging; and to provide an improved method for inserting special sheets as aforesaid in folded paper products.

A selected embodiment of the invention will be described in connection with the accompanying drawings of which there are twenty one (21) sheets.

In the drawings:

Figures 1 and 2 are diagrammatic plan and side elevations respectively illustrating the general arrangements of the apparatus;

Figure 4 is a more or less diagrammatic longitudinal sectional view through another part of the apparatus, it being observed that Figures 3 and 4 together constitute a complete longitudinal section through the apparatus;

Figure 5 is a plan section on the line 5—5 of Figure 3;

Figure 6 is a plan section corresponding in part to Figure 5 but on a larger scale and with certain parts removed or broken away to reveal some details of construction;

Figure 7 is a diagrammatic side elevation illustrating various drives for the apparatus;

Figure 8 is a side elevation corresponding in part to Figure 7 but showing certain parts in greater detail;

Figure 14:
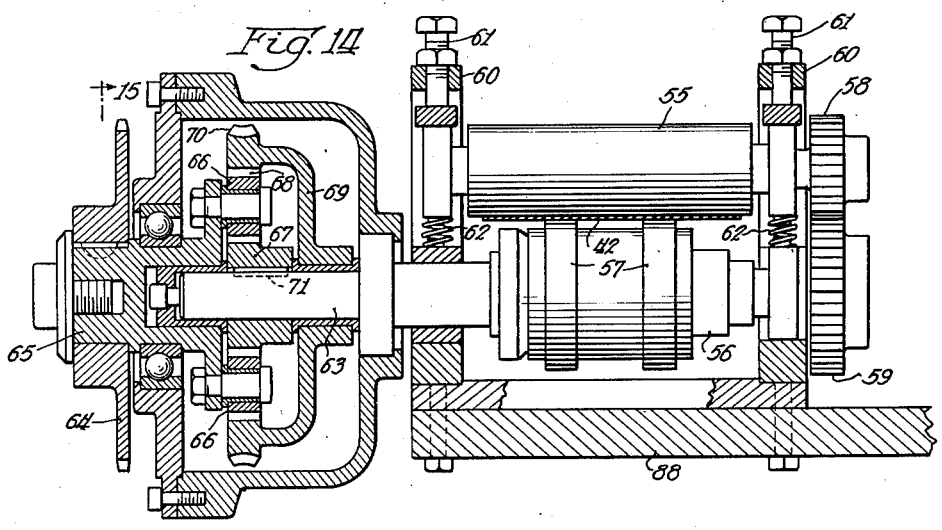
Figure 15:
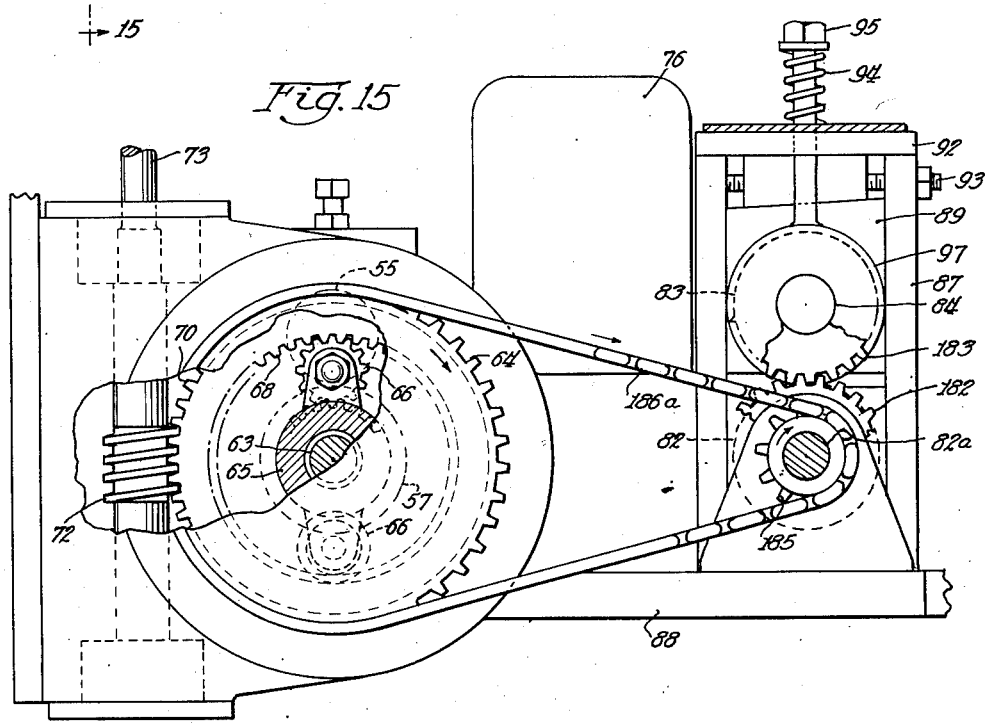

Figures 9, 10 and 11 are sections respectively on the lines 9—9, 10—10 and 11—11 of Figure 5;

Figure 12 is a section on the lines 12—12 of Figures 5 and 9;

Figure 13 is a section on the line 13—13 on Figures 5 and 6;

Figure 14 is a section on the lines 14—14 of Figure 5 and the line 14—14 of Figure 7;

Figure 15 is a section on the lines 15—15 of Figure 5;

Figure 16 is a section on the line 16—16 of Figures 5 and 10;

Figure 17 is an enlarged illustration corresponding to portions of Figures 9 and 10 but showing the parts in greater detail and in a different position;

Figure 18 is an enlarged detail of portions appearing also in Figures 10 and 17 but showing the parts in an intermediate position;

Figure 19 is a section on the lines 19—19 of Figures 6 and 11;

Figure 20 is a plan on the line 20—20 of Figure 9;

Figure 21 is a schematic illustration of certain steps in the method by which the insert sheets are cut from continuous lengths of the desired material and prepared for insertion into the stack of interfolded material which is formed by the interfolding apparatus;

Figures 22 and 23 are perspectives respectively illustrating a so-called pull-out or starter sheet and a so-called reminder or advertising sheet, these sheets being alternately insertable in the stack of interfolded material;

Figure 24 is a perspective illustration showing the arrangement in which the starter or pull-out and reminder sheets are incorporated in a continuously formed stack of interfolded tissues;

Figure 25 is a cross sectional illustration, partly diagrammatic in form, of the manner in which interfolded tissues are packaged for distribution;

Figure 26 corresponds in part to Figure 10 but shows a different position of the parts, the position here shown being the first step in inserting a pre-folded pull-out sheet into a stack of interfolded sheets during the formation of the stack;

Figures 27 and 28 correspond to Figure 26 but illustrate successive positions of the parts;

Figure 29 is a diagrammatic cross section of a stack of interfolded tissues having a reminder sheet and a pull-out sheet incorporated;

Figures 30 and 31 are more or less diagrammatic illustrations of steps performed in separating the interfolded tissues stack into clips or package units containing a predetermined number of interfolded sheets together with the inserted sheet or sheets;

Figure 32 corresponds in part to Figures 2 and 4 but on a larger scale and showing some of the parts in a changed position;

Figure 33 is a cross section on the line 33—33 of Figures 2 and 4;

Figures 34, 35 and 36 correspond to portions of Figure 33 but show successive positions of the operating parts;

Figure 37 is a cross section on the line 37—37 of Figure 4.

The package to be formed

The object of the invention may be somewhat more clearly understood by reference to Figure 25. As there shown a commercial package of interfolded tissues consists of a box 1 having a slot 2 in its top wall. This slot is relatively narrow as shown but it is of a length approximating the length of the box. Interfolded tissues are diagrammatically represented by single lines within the box and these tissues are folded to provide mutually overlapping folds of approximately equal width. The type of fold illustrated is generally referred to in the industry as an "S" fold, one of its distinguishing characteristics being that the crepe is parallel to the fold. The adjacent ends of each pair of tissue folds embraced within another folded tissue may be separated from one another but they are usually disposed end-to-end and integrally interconnected by small, easily breakable bonds. A folded tissue near the top of the box is marked 3. This tissue 3 embraces the lower leg 4 of the next overlying tissue and the upper leg 5 of the next underlying tissue. The leg 4 is connected by the fold 6 to the upper leg 7 which is embraced within the uppermost folded tissue 8. Near the bottom of the box the tissue folds or legs 9 and 10 of another tissue which is folded at 11, encloses the lower leg 12 of the next overlying tissue and also the leg 13 of the next underlying tissue.

The said tissue folds 9 and 10 also enclose a reminder or an advertising sheet 14 which is folded at 15 and 16 into Z-shaped form. When the tissue leg 9 reaches the top of the box and is withdrawn through the slot 2, the leg 13 of the next underlying tissue will also be partially pulled out of the box in the usual manner. When said tissue leg or fold 13 is partially pulled out of the box, as aforesaid, the reminder sheet 14 will also be partially withdrawn from the box so as to be completely withdrawable with the next tissue. This reminder sheet may be imprinted with suitable advertising matter and a suggestion to the user to purchase a new box of tissues to replace the box which is about to be exhausted.

As shown, the reminder sheet 14 is wholly contained between the tissue folds 13 and 13a and it will be observed that the upper leg 17 of the Z-folded reminder sheet is of such width that its free edge does not terminate within the area of the slot 2.

The pull-out or starting sheet 18 at the top of the box may be of the same over-all length as the reminder sheet 14 but it is folded somewhat differently so as to cause the free edge of its upper fold 19 to be accessible within the area of the slot 2. This upper fold 19 is accordingly somewhat narrower in width than the corresponding fold 17 of the reminder sheet. Accordingly, the under folded portion 20 of the starting sheet is also somewhat narrower than the under folded portion 21 of the reminder sheet. Provision is made in the apparatus to deliver to the interfolding apparatus, like reminder and starting sheets but to effect the indicated different folding thereof. The upper fold 19 and the main fold 22 of the starting sheet embrace the upper leg 23 of the uppermost tissue 8. Hence, when the starting sheet is pulled out of the box, the upper fold 23 of the uppermost tissue 8 will also be partially withdrawn through the slot 2.

The starter sheet 18 is initially inserted in the stack of interfolded tissues in the same relationship to the folds of the tissues as represented for the reminder sheet, but provision is made in the apparatus about to be described to separate the fold 19 of the starter sheet from the intermediate fold 22 thereof and to cause the upper fold 23 of the tissue sheet 8 to be embraced between said starter sheet portions 19 and 22.

General explanation of the apparatus

Figure 3:
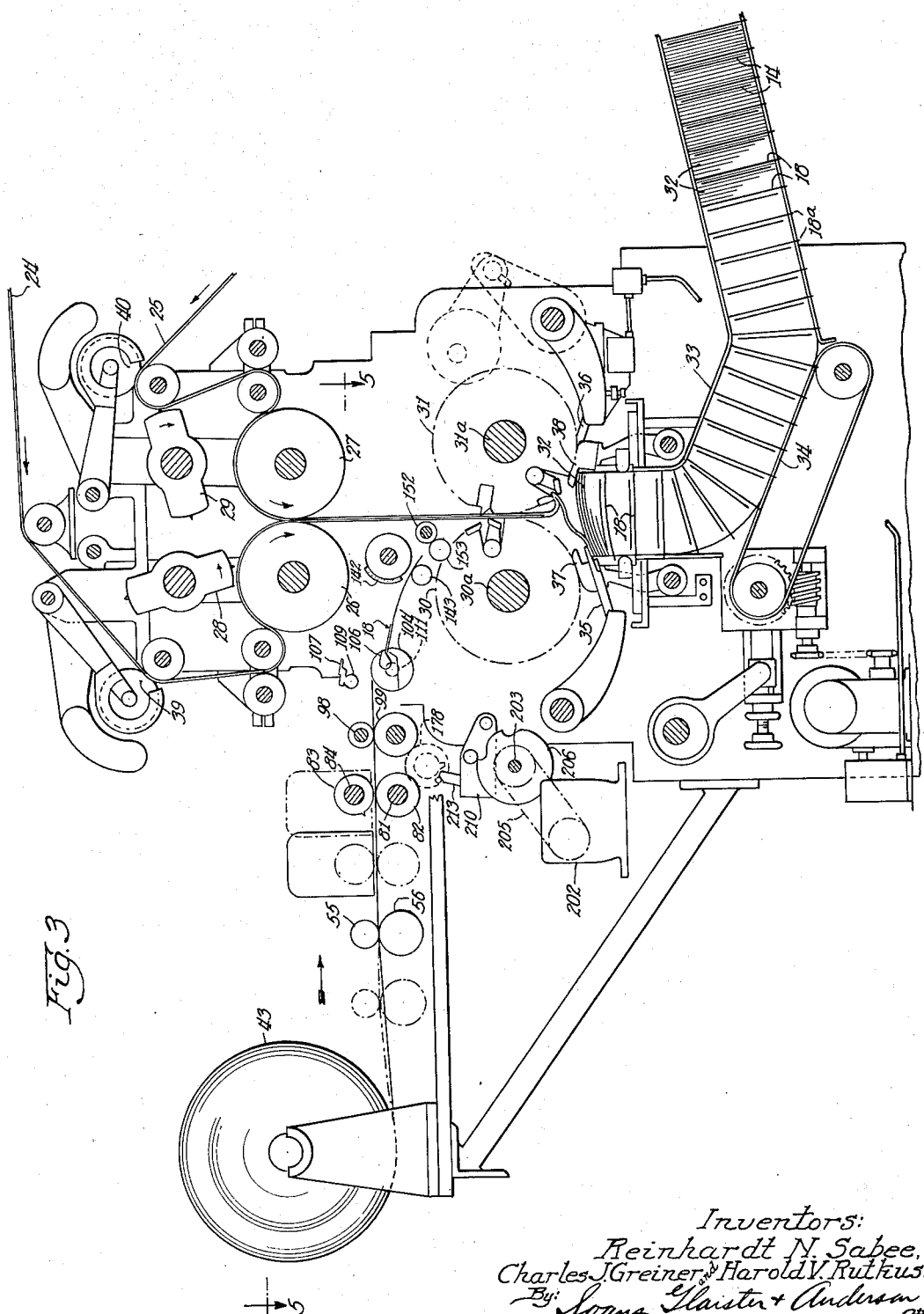
Figure 3 is a more or less diagrammatic longitudinal sectional view through part of the apparatus.

As represented in Figure 3, the principal elements of a suitable type of rotary interfolding machine, comprises guide rolls for guiding a pair of webs 24 and 25 so as to cause them to pass over a pair of anvil rolls 26 and 27 respectively. Rotary knives or knife carriers 28 and 29 cooperate respectively with the anvil rolls 26 and 27 to slit the webs 24 and 25 transversely, preferably in such a manner as to preserve slight bonds in the lines of the transverse cuts so as to maintain continuity of the webbing for passage between a pair of cooperating interfolding rolls 30 and 31 respectively. These interfolding rolls 30 and 31 effect alternate opposite folding of the two webs and deposition of the folded webbing in a stack 32 or on top of a stack 32 which is suitably guided into a guide chute 33. A portion of the guide chute includes a conveyor belt 34 which is suitably controlled to advance the stack 32 at the rate required to maintain the top of the stack 32 in substantially constant relationship to the interfolding rolls 30 and 31. Suitable packers 35 and 36 operate on opposite sides of the stack 32 together with suitable hold-down devices 37 and 38 respectively to hold the top of the stack down in predetermined relationship to the said interfolding rolls.

In the preparation of facial tissues in interfolded packaged form, it has been found expedient to employ tissue webs 24 and 25 of twice the width of the desired tissue packages, these webs being suitably slitted longitudinally by slitter wheels or discs 39 and 40, respectively. As the tissues enter the interfolding apparatus the slit thus formed is substantially complete but as a practical matter there remains a sufficient bond in the longitudinal slit, so that the web portions on opposite sides of the slit will be held together edge-to-edge for passage through the interfolding apparatus as a single web to be interfolded in the form of a double width tissue stack.

Referring now to Figures 1 and 2, there is diagrammatically illustrated in Figure 1 the two tissues 24 and 25 which pass downwardly between the interfolding rolls 30 and 31 to form the double width interfolded tissue stack 32 as already explained. This stack embodies a longitudinally extending slit or line of severance 41 which will permit package size units of the stack 32 to be separated into two separate package length units in a manner already known.

The reminder sheets such as 14 and the starter sheets such as 18 (Figure 25) are supplied from rolls 42 and 43 (Figure 1) of suitable paper strips which have previously been printed with the desired data. In this respect, it is preferred that the starter sheets be formed of calendered paper in order to provide a smooth, stiffened insert sheet which is readily adaptable for use as a starter sheet and, also, as an aid to the separation of the individual packs containing a predetermined number of tissues or the like. The strips of paper from the rolls 42 and 43 are fed through suitable mechanisms represented at 44 (Figure 2) which serve to cut the said strips into sheet units such as indicated at 45 and to fold such units to the form indicated at 46 (Figures 1 and 21) to form either a reminder sheet 14 or a starter sheet 18. These folded sheets 46 are then automatically fed into the interfolding mechanism so as to properly position the sheets 46 in the stack 32 of the tissues. The interfolding mechanism produces the fold at the other end of the respective starter and reminder sheets. As indicated in Figure 1 the sheets 46 are fed into the interfolding mechanism somewhat closer to the line of severance 41 in the tissue webs than to the outer edges of the said webs. This results from space limitations in respect of the mechanism for preparing the sheets 46. These sheets 46, even when located nearer to one edge than to the other of the stacks formed by separation along the slit 41, will nevertheless be suitably positioned in the stacks to serve the starting and reminding purpose already described.

As indicated in Figure 25, the starting sheets 18 have folded edge portions 18a which project somewhat beyond the adjacent normal face or wall of the tissue pack. In the apparatus, these folded edge portions 18a project downwardly from the bottom side of the stack 32 as shown in Figure 2. These projecting folded edge portions 18a are employed to actuate a detector arrangement which sets in motion a pack or clip separating fork 47 which removes from the stack 32 a pack or clip containing the required number of interfolded tissue sheets together with the starter sheet 18 having the detected projecting portion 18a and a reminder sheet 14 if the same is being inserted. This fork 47 operates on the entire width of the stack 32 and delivers a double length pack or clip to the position indicated at 48 where said pack is grasped by jaw sets 49 of a breaker mechanism which separates the double length stack along the line of severance 41 to form two independent stacks or clips of interfolded tissues as indicated at 50 and 51 in Figure 1. As also shown in Figure 1, the stacks 50 and 51 are rotated 90° to cause them to extend lengthwise in the direction in which they are fed to mechanism which is indicated at 52 for rearranging the starter sheet to cause its fold or flap 19 to overlie the tissue leg 23 (Figure 25) as previously mentioned.

From the mechanism 52 the stacks are fed respectively to pairs of gates 53 which are arranged, in accordance with known principles, to drop the stacks on an underlying conveyor 53a which is adapted to carry the packs or clips of tissues to mechanism for enclosing the tissues in boxes such as the box 1 shown in Figure 25.

*Detailed description*

The supply rolls of insert paper 42 and 43 are supported for rotation on suitable standards such as indicated at 54 (Figures 3 and 5) and each of these webs is fed forwardly through like mechanisms for converting the supply strips into the sheet units 45 which ultimately become the folded insert members. The mechanisms which feed the supply strips 42 and 43 forwardly and convert the same into said sheet units are alike for each supply strip except for slight re-arrangement and staggering of parts of one line relative to those of the other line. Such re-arrangement of the parts does not alter their functioning and the corresponding parts of both lines will be numbered the same in the following description.

The supply strips 42 and 43 are intermittently fed respectively by pairs of feed rolls (see Figures 5 and 14) comprising an upper roll 55 and a lower roll 56, the lower roll being equipped with a pair of rubber band portions 57 which are slightly compressible and provide an effective grip on the web between the rolls. These rolls 55 and 56 are geared together by meshing spur gears 58 and 59 which are so selected as to insure like surface speeds for the upper roll 55 and the bands 57 of the lower roll 56. These rolls 55 and 56 are journalled in bearings carried in upstanding brackets 60, the bearings for the upper roll being vertically slidable in said brackets 60 and normally held down in the required relationship to the roll 56 by means of the set screws 61. Suitable springs 62 are provided between the bearings for the upper and lower rolls to yieldingly urge the rolls apart. Hence, by appropriate adjustment of the set screws 61 the gripping pressure between the feed rolls 55 and 56 may be accurately adjusted.

The lower roll 56 has a shaft 63 which is driven by a differential drive connection to a chain driven sprocket 64. This sprocket 64 is keyed to a hub member 65 so as to be in effect a unit with said hub member and the latter is provided with diametrically opposed arms which carry pinion gears 66 which mesh with a sun gear 67 and with an outer internal ring gear 68 which is formed on the inside of an outer gear member 69. The member 69 is journalled for free rotation on a part of the shaft 63 through the agency of a suitable bushing as indicated in Figure 14 and said member 69 has an external worm wheel 70 formed thereon. It will be seen that the gears 66, 67 and 68 constitute a planetary drive for transmitting rotation from the sprocket 64 and hub 65 to the sun gear 67 which is keyed as indicated at 71 to the shaft 63 of the lower feed roll 56.

The worm wheel 70 is in mesh with a worm gear 72 (Figure 15) which is carried by a shaft 73 connected to a suitable worm and worm wheel drive unit 74 (Figures 7 and 8) which is driven by a suitable electric motor 75. This motor 75 is normally stationary and not in operation and the shaft 73 and worm gear 72 are therefore normally stationary so as to hold the member 69 (Figure 14) against rotation. Hence, when the sprocket 64 and the gears 66 are rotated, the rotation imparted to the gears 66 by travelling around the internal gear 68 will be imparted to the pinion gear 67 and the shaft 63 of the lower feed roll 56.

By driving the worm gear 72 and the worm wheel 70 and hence the internal gear 68 in the proper direction, the rate at which the rotation of the sprocket drives the feed rollers may be accelerated. The electric motor 75 which drives said worm gear is controlled by an electric eye inspecting device 76 which is governed by dark printed inspection or registration areas 77 (Figure 6) on the paper strip, and by an electric switch 78. This switch 78 is controlled by a pivoted rock arm 79 which is actuated by a rotating cam 80 (Figures 9 and 11). The cam 80 is carried by an extension of a shaft 81 or 82a of a rotating cutter structure which cuts the paper strip into the required insert forming sections 45.

The paper strip 42 (and 43) is of light colored paper which will reflect light from a source constituting a part of the electric eye inspection unit. The main drive for the feed rolls 55 and 56 is made to drive the paper strip slightly slower than is required. Hence, from time to time, the dark inspection or registration area will lag so that during a short interval that the switch 78 is closed, a register mark on the web 42 will enter the inspection area of the electric eye so as to cause the flow of current to drive the motor 75.

The motor 75 when energized as first explained, imparts accelerated movement to the paper strip to advance it to proper position for transverse severance by cutting mechanism which will presently be described. The motor can be made to operate as long as necessary by cam 80 or by an electronic timing circuit. In this way, the strip is maintained in the desired relation to the severing apparatus so that severance of the strip will always be effected within a very limited distance from a predetermined position between successive printed areas of the paper strip 42.

Normally the registration area 77 will be brought up to proper place during a single inspection period which is determined by the said rotating cam arm 80 and the switch 78 controlled by such arm. In the event that the paper has lagged excessively, two or possibly three inspection periods might be required to bring the paper strip into proper position but any such occurrance would be the exception rather than the general rule. The normal feed of the strip is calculated to be so very near to the actual rate required that but slight lagging can occur so that a single inspection period normally affords adequate time to effect proper registration of the paper strip.

The cutter for each web comprises (see Figures 5, 10 and 11) a lower anvil roll 82 which is carried by the said shaft 81, and an upper knife roll 83 which is carried by a shaft 84. On the face of the roll 83 there is provided a projecting cutting knife formation 85 of suitable form to cut the web along the irregular line indicated in Figures 6 and 20. These cutting rolls 82 and 83, like the feed rolls 55 and 56 are rotated intermittently. In the position illustrated in Figure 10 the sheet or web 43 is shown at rest as are also the cutter rolls 82 and 83. The surfaces of the rolls 82 and 83 are spaced sufficiently to permit the web to slide freely therebetween when fed by the rolls 55 and 56 and the web is gripped between the cutting rolls 82 and 83 only when the knife section 85 presses the web against the surface of the anvil roll 82 to effect the web cutting operation. The rolls 82 and 83 are rotated so that the cutting edge of the knife 85 and the surface of the roll 82 travel at like speeds consistent with the speed at which the web 42 or 43 is fed.

The anvil roll shaft 81 is journalled in suitable bearing blocks 86 which may be fixedly mounted in a bracket structure 87 which extends upwardly from a normally stationary table plate 88 which is carried by a suitable supporting frame structure. The shaft 84 of the knife roll 83 is journalled at its ends in suitable bearing blocks 89 which are vertically slidably mounted in the brackets 87 and these bearing blocks 89 are provided with inclined upper ends 90. The inclined ends 90 of the bearing blocks are adapted to cooperate with wedges such as indicated at 91 which also engage cross bars or plates 92 secured to the upper ends of the brackets 87. Adjusting screws 93 threaded through the arms of the bracket structure 87 are adjustable to shift the wedge 91 in either direction to either force the bearing block 89 downwardly or to permit the same to be moved upwardly. Also provided in each of the bearing blocks 89 is a threaded bore 300 for receiving a vertical adjusting screw 301 which extends downwardly through an opening in the cross bar 92 and an elongated slot 302 in the wedge 91 into the bore 300. Thus it is seen that upward movement of the bearing blocks 89 is effected through rotation of the screw 301 in conjunction with the desired adjustment of the screws 93.

At the outer ends of the shaft 84 there is further provided a pair of anti-friction bearings 97 which depend from a rod 96 extending through a suitable opening in the overlying frame members and yieldably held in vertical position by means of a nut 95 and a spring 94 interposed between the nut 95 and the frame. The journal bearing thus provided by the bearing block 89 and the bearing 97 is of the type more fully disclosed in the copending Sabee application, Serial No. 166,449, Journal Bearing, filed June 6, 1950 (U. S. Patent 2,652,292, September 15, 1953).

A second pair of feed rolls 98 and 99 (Figures 10 and 12) grips the cut-off web portion to continue its feed after the cutting operation has been completed. These feed rolls 98 and 99 are also rotated intermittently and in the position shown in Figure 10 are at rest. The upper feed rolls 98 are plain cylindrical rolls but the lower feed rolls 99 are rubber banded substantially as described above in respect of the first set of feed rolls 55 and 56. The lower feed rolls 99 of each pair, are secured to a single shaft (Figure 12) and the outer ends of the cooperating upper and lower feed rolls 98 and 99 are geared together by means of intermeshing gears 100 on the upper feed roll shaft, and 101 on the lower feed roll shaft. The lower feed roll shaft is extended beyond the gear 101 at one side and is provided with a gear 102 by means of which said lower feed roll shaft is intermittently driven as will hereinafter be explained. The shafts for the rolls 98 and 99 are suitably journalled in upstanding brackets 103 and suitable provision such as described in connection with the feed roll pair 55 and 56 may be made for controlling the cooperating relationship between the respective upper feed rolls 98 and lower feed rolls 99. The lower feed rolls 99 are provided with flattened, recessed surface portions which are disposed opposite the upper rolls 98 while the rolls are stationary. Space is thereby provided between the rolls to permit the paper strip to slide between said rolls to smooth out any buckling which may occur in the strip as it approaches the rest position shown in Figure 10.

The feed rolls 98 and 99 deliver the strip to a gripper roll 104 which includes a stationary jaw section 105 and a pivoted jaw 106. A rotating tucker blade 107 disposed above the roll 104 is operative to tuck the cut-off sheet portion 34 between the jaws 105 and 106 substantially as shown in full lines in Figure 17. This tucking of the sheet 45 between the fixed and movable jaws 105 and 106 produces the fold which ultimately becomes the folded edge 18a of a pull-out sheet or the folded edge 15 of a reminder sheet 14 (Figure 25).

The tucking plate 107 is carried by a cradlelike bar 108 which has end shafts 109 suitably journalled in anti-friction bearings carried by upstanding brackets 110 which are mounted on the said frame plate 88 (see Figure 16). Similarly the rotating gripper roll 104 has end shafts 111 journalled in suitable bearings 112 also mounted in said brackets 110. At one end, said shafts 109 and 111 are extended and provided with gears 113 and 114 respectively which mesh with one another so as to maintain the rotating tucker and gripping roll in predetermined synchronized relationship.

The pivoted jaw 106 of the gripping roll has end extensions 115 suitably journalled in end portions of the main body 104 of the gripping roll as best shown in Figure 16. At one end of the jaw 106, the bearing element 115 is long enough to also receive a split arm 116 (see Figure 17) which is clamped in the desired position of rotary adjustment relative to the arm 106 by means of a clamping screw 117. This arm 116 carries a roller 118 (see Figures 16 and 17) which engages an internal cam surface 119 against which said roller is held by a compression spring 120 under compression between an end portion of the arm 116 and a portion of the main jaw body 104.

Figure 17 shows the tucking plate 107 and the gripping roll 104 in approximately the initial tucking position. Figure 18 shows an intermediate position in which the tucking plate 107 has been withdrawn from between the jaws and the tucked-in strip portion is securely held between the jaws 104 and 106.

As shown in Figure 18, the portion 19 of the web which initially trails the tucked-in portion (see Figure 17) has been folded over into forwardly overlapping relation to the main body 22 of the now folded sheet 46. This forward folding of the flap portion 19 is effected by means of an air blast delivered by air pipes or nozzles such as indicated at 121 (see also Figure 5) which communicate with a compressed air supply pipe 122. As shown in Figure 9, this pipe line 122 communicates with a valve 123 to which air is supplied under pressure from a supply line 124. The valve 123 is periodically opened by means of a cam 125 which acts on the valve actuating lever 126.

The air folded flap 19, as shown in Figure 18, is further subjected to folding pressure by means of a folder arm 127 which is carried by a rock shaft 128. From the elevated position of the folder or pressure arm 127 shown in Figure 18, said arm is rocked downwardly to the position shown in Figure 10 in which it is operative to press the flap 19 and the underlying main body part 22 of the insert sheet into flatwise position on a guide tray 129. Rocking of the shaft 128 to properly actuate the presser member 127 is effected as shown in Figure 9 by means of a rotary cam 130 which acts against a cam following roller on an arm 131 which is secured to one end of the tucker plate carrying end shaft 109 (see Figure 16).

As shown in Figure 5, there are separate presser members 127 and separate trays 129 for the respective webs 42 and 43. Each tray 129 includes upstanding side portions 132 (see Figures 6 and 10) in which are mounted guide rollers or hold down bars 133, which may be rotatable but are preferably fixed and which are provided to hold the folded insert sheet down against the respective trays 129 as will be readily understood from an inspection of Figure 10. As shown in that figure, the guide chutes or trays 129 are curved downwardly to guide the insert sheets into the nip or bight of the interfolding rolls 30 and 31, the discharge ends of the guide chutes terminating adjacent the path of movement of the tissue sheets into the said interfolding roll bight. For maintaining the tissue sheets in close relation to the guide chutes 129, there is provided a pair of curved strap members 305 for each of the chutes. The members 305 are preferably pivotally mounted at one end on the bar 133 and extend from the bar 133, in closely overlying relation to the chute, to a position beyond the forward end of the chute 129. Said guide chutes 129 are mounted on a suitable cross rod 134 and are normally held in fixed position on said cross rod by means of set screws indicated at 135. Said rod 134 is mounted for limited vertical adjustment in vertically slotted bracket 136 (see Figures 5 and 9), the shaft ends being received within the vertical slots as shown best in Figure 9. Upper and lower adjusting screws 137 and 138 respectively are provided for facilitating adjustment and positioning of the shaft 134 at the desired elevation whereby the elevation of the tray 129 may be set as desired. It will also be apparent that the trays may be adjusted rotatably about the shaft 134 to provide further selection of tray position. The brackets 136 are mounted as shown in Figures 5 and 9 by being secured to other brackets 139 which are in turn bolted to a fixed cross rod 140 which is a part of the frame structure of the interfolding machine.

The insert sheets such as 18 are delivered one by one to substantially the position shown in Figure 10 in which position the insert sheet is temporarily held by a presser 127 until the time arrives for its insertion into the stack of interfolded tissues. When the insert sheet reaches the position on the tray 129 in which it is shown in Figure 10, the jaw 106 of the gripper roll 104 is adjusted by the cam 119 to release the sheet, the sheet being then rather lightly held on the tray 129 by the presser 127.

From the tray 129, the insert sheets are fed into the bight of the interfolding rolls by means of a feed roller 141 which is continuously driven to make one rotation for each transversely severed length of tissue in the tissue web 24 which passes downwardly to the interfolding rolls 30 and 31.

The feed roller 141 has a segment 142 which cooperates with a feed roller 143 which is disposed on the opposite side of the insert sheet in register with a slot 144 in the guide chute or tray 129. The feed roller 143 is rotatably mounted as indicated at 145 in one end of an arm 146 (see also Figure 20) which is mounted at its other end on a shaft 147 which is journalled at its ends in bearings 148 (see Figure 16) which are formed integrally with the beforementioned brackets 139. As shown in Figure 10, the end portion of the arm 146 which is mounted on the shaft 147 may have a split hub which will permit clamping of the arm in any selected position of adjustment on the shaft 147.

One end of the shaft 147 is provided with a lever or arm 149 (see Figures 9 and 16) which is connected by suitable links 150 to the movable core or plunger of a solenoid 151. The solenoid is adapted to be periodically actuated to rock the shaft 147 so as to move the lower feed roller 143 upwardly into position for cooperating with the feed segment on the upper roller 141 to grip the insert sheet between such lower feed roller and feeding segment thereby to feed the waiting insert sheet downwardly along the guide chute 129. When the waiting insert sheet 18 is moved a short distance from its initial position as shown in Figure 10 on the chute 129, the leading end of such insert sheet enters between a continuously driven feed roller 152 and a pressure roller 153 which holds the insert sheet against the surface of the driven feed roller 152. Said pressure roller 153 is journalled in one end of an arm 154 which is rockably mounted intermediate its ends on the shaft 147, the other end of said arm 154 extending under the before-mentioned cross rod 140 and being provided with a set screw 155 which is threaded through the arm and is adapted to engage the rod 140. By adjusting the screw 155, the cooperating relationship between the feed roller 152 and the pressure roller 153 may be suitably adjusted. These cooperating insert sheet feed rollers 152 and 153 are of small diameter and located well in the bight between the folding rolls 30 and 31 and between the roll 30 and tissue web 24 so as to maintain control of the insert sheets after they are released by the feed segment 141 and roller 143 and until said sheets are effectively held by a pair of folding jaws 156.

As indicated in Figure 10, interfolding of the two tissue webs 24 and 25 is effected by means of cooperating jaw sets 156 in one of the interfolding rolls and a tucker blade 157 in the other interfolding roll. In accordance with known practice, each of the interfolding rolls 30 and 31 is equipped with a plurality of jaw sets such as 156 and a plurality of tucker blades such as 157, the jaw sets and tucker blades being alternately arranged in the respective rolls and the tucker blades of one roll being timed to cooperate with the jaw sets of the opposite roll. Accordingly, in the interfolding operation, the sheet will be alternately tucked into the rolls 30 and 31 to produce the usual zig-zag type of folding which is employed in producing either folded single sheets or the illustrated interfolded tissue sheets. These usual interfolding steps are employed in connection with the incorporation of insert and reminder sheets into the stack.

The steps by which an insert sheet is incorporated in the stack of interfolded sheets during the production thereof, are represented in Figures 26 to 28, inclusive. In the first step shown in Figure 26 a portion of the insert sheet 18 near its leading end, is tucked by a tucker 157 in the roll 30 between the jaws 156 of the roll 31. These jaws close on the tucked-in portions of the tissue webs and the insert sheet and thereby produce one of the folds and also the underfolded leading end portion 20 of the insert sheet as shown in Figure 22. It may be observed that in this instance the illustrated insert sheet is so cut that the underfolded portion 20 consists of two small triangular portions. This results from the cutting of the sheet to provide a more or less tapered end portion at the other end of the sheet which will ultimately be the accessible end of the starting sheet in a tissue package.

As the roll 31 progresses, the jaws 156 carry the tucked-in tissue sheet and insert sheet portions downwardly to about the position represented in Figure 27 where the jaws are opened and the sheet released therefrom and packed down on the stack in the manner already explained. At about the time that the jaws in the roll 31 are releasing the webs and insert sheet, the next tucker in the roll 31 is tucking the webs and the then trailing portion of the insert sheet between the opposed, open jaws of the roll 30 as shown also in Figure 27. The trailing portion of the insert sheet together with the tucked-in tissue web portions will accordingly be carried down to the opposite side of the stack 32 as shown in Figure 28 and the jaws opened to thereby permit the packers and hold-down arms to complete the operation.

The insert sheet 18 is moved into position alongside the path of the webs 24 and 25 by the feed rollers 152 and 153, the insert sheet movement being initiated by the feed roller 141 and segment 142 in cooperation with the pressure roller 143. This insert sheet feed is effected in such timed relation to the movement of the webs 24 and 25 that the leading end portion of the insert sheet is tucked between the jaws in the interfolding roll 31 as shown in Fig. 26, and thereby folded in unison with the tissue webs, the insert sheet being folded inside of the tissue webs.

When the insert sheet is a "starting" sheet such as shown in Fig. 22, the timing of the feed of the insert sheet is delayed so that only a narrow leading end portion of the sheet is folded, in this instance only the triangular end portions 20 as shown in Fig. 22, so that the starting sheet is caused to have a length which is greater than the corresponding dimension of the interfolded tissue webs. The two-ply trailing folded end portion of such insert sheet will similarly be tucked into a jaw set of the roll 30 as shown in Fig. 27 and will also be folded in unison with the tissue webs but outside of the same. When this folded trailing end portion is released by the folding jaws, the inherent resiliency of the calendered, relatively stiff paper of which the insert sheets are made, causes the folded trailing portion of the insert sheet to unfold itself and project from the adjacent side of the tissue stack as shown in 18a at Fig. 29.

When the insert is a "reminder" sheet such as shown in Fig. 23, the insert feed initiating pressure roll 143 is actuated in such timed relation to the travel of the tissue webs that a wider leading end portion of the insert sheet will be folded as indicated in Fig. 23 so that the length of the folded insert reminder sheet will be no greater and preferably less than the corresponding dimension of the interfolded tissue webs. The trailing end portion of the "reminder" sheet will accordingly be disposed in such relation to the folding jaws in the roll 30 that the sheet will not be tucked thereinto and such "reminder" sheet will be delivered into position wholly within the stack of interfolded tissues as shown at 14 in Fig. 29. The insert sheet, whether a "starting" sheet or a "reminder" sheet, is at all times under positive control, finally by the folding jaws which deliver the sheet accurately into predetermined position in the stack of interfolded tissues.

If a box is to contain say 150 tissues, the solenoid actuated pressure roll 143 will be moved up into operative relation to the feeding segment 142 (Figure 10) once for each 150 sheets that are delivered to the interfolding rolls. Hence, for each 150 sheets of tissues delivered to the interfolding rolls one insert sheet would be delivered. The solenoid 151 which controls the pressure roll 143 is actuated by means of a sheet counting arrangement which is connected in the driving mechanism for the interfolding apparatus. Such counting device, one of which is commercially known as a "Cyclomonitor," embodies an arrangement for closing an electric circuit to the solenoid 151 when the proper count of tissue sheets has been made.

When a reminder sheet such as represented at 14 in Figure 25 is also to be incorporated, a second sheet counting device is provided for establishing an electric circuit to the said solenoid 151 after a predetermined number of sheets have been delivered to the stack following the delivery of the insert sheet 18. This second sheet counter is so adjusted as to cause the circuit to the solenoid 151 to be completed at a somewhat earlier point relative to the position of the feeding segment 142 (Figure 10) so as to cause a longer leading end portion of the waiting insert sheet to be fed between the interfolding rolls 30 and 31 so that a longer leading end flap portion will be folded under as indicated at 21 in Figure 23. In that event, the trailing previously folded portion of the insert sheet may or may not be gripped by folding jaws but will nevertheless be pulled down into the stack to assume a position such as represented in Figures 24 and 25.

The means for driving the various elements of the mechanism thus far described will now be explained.

The main drive for the interfolding machine is an electric motor 158 (Figure 2). A chain 158a is driven by this motor and this chain drives a shaft 159 which carries a gear 160 and a sprocket 161. The gear 160 meshes with an idler gear 162 which in turn meshes with a gear 163 on the shaft 30a of the interfolder roll 30. At the other side of the machine (see Figure 7) the interfolder roll shaft 30a is equipped with a gear 164 which meshes with a similar gear 165 on the shaft 31a of the interfolder roll 31 so that the interfolding rolls 30 and 31 are driven in synchronized cooperative relation to each other.

The sprocket 161 on said driven shaft 159 (Figure 2) engages a chain 166 which also engages sprockets 167 and 168 on the before-mentioned sheet counting devices which are represented at 169 and 170 in Figure 2. It will be seen that by appropriate selection of the sprockets 161, 167, and 168, the counters 169 and 170 will be driven in synchronized relation with the movement of the tissue sheets between the interfolding rolls so that the counting devices will be enabled to close electric circuits to energize the solenoid 151 (Figure 10) at intervals suitably timed to effect delivery of the starting and reminder insert sheets as may be desired during the formation of the stack of interfolded tissues.

Another chain 171 is also driven by said motor 158 and this chain in turn drives a suitable speed reducing structure indicated at 172 in Figures 2 and 8. The output side of the speed reducer 162 drives a chain 173 which in turn drives a sprocket 174. The sprocket 174 is secured to or formed integral with a gear wheel 175 (see Figures 8 and 11) and said sprocket and gear wheel are rotatably mounted on a stub shaft 175a carried by a bearing secured to the frame structure of the machine.

The gear 175 which is continuously driven in the manner just indicated meshes with a gear 176 which is mounted on the input shaft of a one-revolution clutch structure represented in Figure 13. This clutch includes a continuously driven body part 177 and a driven part 178 which is coupled to the main body part 177 at selected intervals for feeding and cutting the insert paper strips. When said driven clutch part is engaged and driven, a clutch shaft 179 on which said member 178 is mounted, is also driven. Said clutch shaft 179 carries a gear 180 which meshes with the gear 102 (Figures 7 and 12) carried by an extension of the shaft of the lower feed roller 99. Hence, the lower feed roller 99 is driven in accordance with the engagement of the clutch part 178, and through the intermeshing gears 100 and 101, the upper feed roller 98 is also driven. The gear 102 of the lower feed roller 99, also meshes with an idler gear 181 (Figures 6 and 7) which in turn meshes with the gear 114 of the gripper roll 104. Hence, the gripper roll is driven in accordance with the engagement of the clutch structure as is also the tucker 107 incident to the intermeshing of the gears 113 and 114.

The clutch gear 180 also meshes with a gear 182 (Figures 6 and 7) on the shaft 82a of the lower or anvil roll 82 of one of the cutting roll sets, said gear 182 being also meshed with a gear 183 on the shaft of the cooperating upper knife roll of such cutting set. The gear 182 also meshes with an idler gear 184 which in turn meshes with a gear 182a (see Figures 7 and 11) of the anvil roll of the other cutter set and said gear 182a meshes with a gear 183a of the cutter roll of said other cutting roll set. The shaft 81 of the anvil roll of the last mentioned cutting roll set carries a sprocket 185 which drives a chain 186 that drives the differential drive sprocket 64 (see Figure 5) whereby the variable speed drive mechanism for the one set of feed rolls 55, 56 is driven. The other cutter roll set which is shown in the lower half of Figure 5 similarly drives the differential drive mechanism for its cooperating feed roll pair, by means of a chain 186a from a sprocket 185a on the shaft of the anvil roll of said other cutter set (see also Figure 7).

As shown in Figure 7, the gear 165 of one of the interfolding rolls drives a train of gears 187, 188, 189, 190 and 191, the latter two gears being mounted on the shafts of the anvil rolls 26 and 27 of the interfolding mechanism (Figure 3). The tissue cutting rolls 28 and 29 may be driven by means of gears 192 and 193 which respectively mesh with the anvil roll gears 190 and 191.

The gear 189 (Figure 7) also drives a gear 194 on a shaft 194a which also carries a gear 194b (see Figure 5). The gear 194b meshes with another gear 195 (see Figure 6) and the latter drives two gears 196 and 197 (Figure 7). The gear 196 is on the shaft 198 which carries the insert sheet feeding roll 141 (Figures 6 and 10). It will be seen that since the interfolding rolls are continuously driven, the gear trains just described will also be continuously driven and that the shaft 198 and the insert feed roll 141 (Figures 6 and 10) will also be continuously driven. The gear 197 (Figure 7) is fast on the shaft which carries the feed roll 152 (Fig. 10) which is accordingly driven at the desired peripheral speed.

The shaft 198 (see Figures 6 and 8) also carries a sprocket 199 which drives a chain 200 that engages and drives a sprocket 201 on the input shaft of a speed reducing mechanism 202. This chain 200 is guided past a shaft 203 by a sprocket 204 on said shaft, said sprocket being freely rotatable on the shaft and suitably positioned thereon. This shaft 203 is rotated continuously from the output shaft of the speed reducer 202, the latter being connected by a chain drive 205 to said shaft 203 (see Figures 8 and 11). The shaft 203 carries the air blast controlling cam 125 previously referred to (see Figures 9 and 12).

Said shaft 203 also carries a cam 206 (Figures 11 and 13) which is secured to the shaft so as to rotate continuously therewith. This cam 206 controls the clutch structure comprising the parts 177 and 178 whereby feeding of the insert sheet material is controlled. The cam disc 206 is provided with a pair of cam recesses respectively indicated at 207 and 208, the recess 207 being provided for effecting engagement of the clutch to feed material to form a pull-out or starter sheet 14, and the notch 208 for engaging the clutch to feed material to form the reminder sheet 14. These notches 207 and 208 are of course arranged in such circumferentially spaced relationship as to effect the feeding of the reminder and insert sheets in properly timed relation to the actuation of the feeder rolls 141 and 143 (Figure 10) by the counting devices or Cyclomonitors 169 and 170 (Figure 2).

As already indicated, the sheet cutting mechanisms and the sheet tucking and folding mechanisms 104—107 are single revolution devices, and the clutch structure 177 and 178 is also a single revolution clutch, i. e., the clutch is automatically disengaged upon the completion of one revolution. Said clutch is of a commercially known character which is advantageously released by an impact action. Impact release action is obtained by means of the following mechanism controlled by the cam 206. The periphery of the cam 206 acts against a roller 209 (Figures 11 and 19) which is carried by a plate 210 that is pivotally mounted as indicated at 211. A spring 212 stretched between a portion of the plate 210 and an anchoring point on the supporting frame structure normally holds the roller 209 in engagement with the periphery of the cam. A rock arm or impact arm 213 is pivoted as indicated at 214 on the plate 210 and the upper end portion of said impact arm 213 is formed to be engageable with a pin 215 which projects from the driven clutch element 178. A spring biased plunger 216 mounted on the rock plate 210 serves to yieldingly urge the impact arm 213 against a stop pin 217 on the plate 210. The hub portion 178a of the clutch element 178 is provided with a projecting finger portion 178b which is somewhat in advance of the clutch pin 215.

The clutch structure and the cam rotate in the direction indicated by arrows in Figure 19. As the clutch completes a revolution, the finger 178b engages the impact arm 213 to rock it back to the position indicated in dotted lines in Figure 19 against the pressure of the spring biased plunger 216. When the finger 178b passes and releases the impact arm 213 the plunger 216 forces said impact arm 213 to rock back toward the stop pin 217 with a sharp or fast movement whereby the upper end portion of said impact arm 213 strikes the clutch pin 215 with a sharp blow to thereby effect disengagement of the clutch. This arrangement stops the clutch in the same position each time that it is disengaged. Hence, the mechanisms for feeding and cutting the supply strips is also stopped in the same position after each operation.

In the illustrated arrangement thus far described, the pull-out sheet edge portions 18a are caused to project from the bottom of the horizontally extending portion of the stack 32 of interfolded tissues. This arrangement is desirable where automatic separation of the stack into package size units is employed in that it facilitates location of the separating mechanism underneath the stack rather than above it so that there is less danger of spoiling any of the interfolded tissue material incident to oil droppings or the dropping of other foreign matter from overlying equipment. However, in some cases it may be preferred to cause the edge portions 18a of the starter or pull-out sheets to project from the top of the stack. Such an arrangement may be employed in connection with automatic mechanism for separating the stack into package size units and it may also be advantageously employed in cases where the stack separation is to be manually performed. For manual separation it would of course be advantageous to have the projecting marker portions 18a on the top of the stack where they would be readily visible. To locate the tab portions 18a on the top of the stack, the inserting mechanism just described should be located on the opposite side of the interfolding mechanism from that in which it is herein shown. When located on the opposite side the arrangement would be reversed and the projecting pull-out sheet portions would then project from the side of the stack 32 which becomes the top side of the horizontally extending portion of the stack. It will be apparent that such a reversed arrangement may readily be made by skilled mechanics in view of the foregoing explanation.

The mechanism for mechanically separating the stack into package size units will now be described.

The package unit separating clamp structure 47 shown in Figure 2 comprises a series of fingers 218 (see also Figures 32 and 37) which are pivotally mounted near their lower ends as indicated at 219 in opposed relationship to a corresponding series of relatively stationary fingers 220. The fingers 220 extend upwardly from one side of a base 221 to the other side of which the fingers 218 are pivoted. The width of said base 221 corresponds approximately to the width or thickness of the packageable unit of tissues which are to be separated from the stack 32. The finger base 221 is secured to a pair of arms 222 (see Figures 2 and 37) which are secured to a cross shaft 223. The cross shaft 223 is carried by a pair of arms 224 which are supported in such a manner that the pivot shaft 223 may be shifted both vertically and horizontally. To that end, the arms 224 are interconnected by a pair of cross rods 225 and 226. A link 227 which extends between the cross rod 225 and the free end of a cam actuated rock arm 228 serves to support the cross rod 225. The cam actuated arm 228 is pivoted at its other end on a pivot shaft 229 and it is connected to the cam arm 230 which has a cam follower roller 231 which engages the periphery of a rotating cam 232.

In a similar manner, the cross rod 226 is supported by a link 233 which at its upper end is connected to said cross rod 226 and at its lower end is mounted on the pivot shaft 229 so as to be rockable with the latter. The pivot shaft 229 has secured to it an arm 234 which has a cam following roller operatively engaging the periphery of a cam disc 235 which is carried by the cam shaft 236 which carries also the aforementioned cam 232.

By reference to Figure 2, it will be apparent that the cam 232, acting through the lever 230, the arm 228 and the link 227 will impart a vertical component of movement to the cross shaft 225 and to the pivot shaft 223. Similarly the cam 235, acting through the cam lever 234 and the rock arm 233 will impart a horizontal component of movement to the cross shaft 226, the arms 224 and the gripper pivot shaft 223. These cams 232 and 235 are so timed that from the starting position of the gripper structure 47 in Figures 2 and 4, the gripper structure will be moved upwardly and rearwardly so that the pointed upper ends of the rear fingers 220 will follow the rearwardly and upwardly inclined line of separation between packageable units of the stack 32 as indicated by the separator or starting sheets 18.

The cam shaft 236 is driven in timed relationship or synchronization with the interfolder mechanism from the main driving motor 157 (Figure 2) through a chain drive connection 237 to a speed reducing unit 238 and thence by a chain drive 239 to a sprocket 240 (Figure 37) on the input shaft of a one-revolution clutch 241 which is preferably electrically controlled. The cam shaft 236 is the output shaft of the said one-revolution clutch 241. This clutch is controlled by a suitable electric switch 242 (Figure 32) which is adapted to be closed by the movement of a trigger arm 243 which may be effected incident to engagement of the free end of said arm with the projecting separator or starter sheet portions 18a. Hence, each time a portion 18a of a starting sheet rocks the arm 243 the switch 242 will be closed and the single revolution clutch 241 actuated to rotate the cam shaft 236 one revolution.

From the starting position of the gripper fingers 218 and 220 as shown in Figures 2 and 4, the said fingers are moved upwardly and rearwardly to the tissue pack gripping position shown in full lines in Figure 32. From this tissue pack gripping position, the fingers 218 and 220 are rocked to a generally horizontal position and simultaneously advanced to the delivering position shown in dotted lines in said figure.

While the gripping fingers 218 and 220 are in their lower or starting positions as shown in Figure 4, the front end of the stack 22 of tissues is supported by a series of fingers 244 which depend from a pivoted cross rod 245. When the gripper fingers 218, 220 have gripped a pack of tissues as shown in full lines in Figure 32, the fingers 244 are rocked to an out of the way position as shown in dotted lines in Figure 32 to permit the grippers 218, 220 to move forwardly to the said dotted line position shown in Figure 32. Rocking of the fingers 244 may conveniently be effected by means of a pneumatic or hydraulic cylinder 246 which has its piston connected to an arm 247 which is secured to said cross shaft 245. The delivery and relief of pressure fluid to and from the cylinder 246 may be controlled by a valve 248 (Figure 37) which may be controlled by a cam 249 on the cam shaft 236.

As the fingers 218 and 220 approach their uppermost position as shown in Figure 32, retaining fingers 250 which depend from a cross bar 251 are lowered into the stack to temporarily support the front end while the normal supporting fingers 244 are rocked to their out of the way position and while the grippers 218 and 220 carry the gripped section of the stack away therefrom as already indicated. The cross bar 251 which carries the temporary supporting fingers 250 may be moved up and down by means of a hydraulic cylinder 252 (Figure 4) which has a piston rod 253 to which the cross bar 251 is secured. The admission and relief of pressure fluid to and from the cylinder 252 may be controlled by a valve 254 which is controlled by the cam 255 on the cam shaft 236 (Figure 37).

During the time that the clamping fingers 218 and 220 are in an advanced position and while the temporary supporting fingers 250 are in their inoperative position, the tissue stack 32 is of course continuing to advance. In order to permit such advance to continue without subjecting the stack to excessive compression, provision may be made for causing said temporary supporting fingers 250 to move forwardly at approximately the same rate that the stack 32 moves forwardly. To that end the hydraulic cylinder 252 may be mounted on guides such as indicated at 256 (Figure 4) for movement in parallel relation to the advance of the stack 32 and such movement may be imparted to the cylinder 252 by another hydraulic cylinder 257, which has its piston rod 258 secured to said cylinder 252. The admission of pressure fluid and relief of the same to and from the cylinder 257 may be controlled by a valve 259 which is controlled by a cam 260 on the cam shaft 236 (Figure 37).

When the gripping fingers 220 move upwardly into the stack, they do so immediately behind the insert sheet 18 whose projecting portion 18a has initiated the movement of the gripping fingers. As already stated, these fingers move upwardly and rearwardly but it is preferable that the rearward component of movement be slightly less than the full rearward movement which would be required to cause the fingers 220 to move upwardly in parallelism with the plane of the insert sheet. By properly limiting the rearward component of movement, the fingers 220 will, in effect, be caused to slightly advance the leading portion of the stack which is then embraced between the fingers 218 and 220 to effect slight separation in the stack as indicated in Figure 32. Such separation will tend also to space the fold 261 (Figure 30) of tissue immediately following the insert element 18 from the next following fold 262 to thereby facilitate entrance of the temporary supporting fingers 250 into the stack without crumpling any of the tissue folds.

In the formation of the stack of interfolded tissues, slight bonds remain in the transverse lines of severance in the tissue webs. These transverse, bond retaining lines of severance occur in each instance in the tisue which is within the folds of another tissue, the line of severance being located in registration with the fold line of the embracing tissue. For example, in Figure 30, bond retaining transverse lines of severance occur at 263 in the inside tissue web 24 and at 264 in the inside tissue which at that point is the other tissue 25. When the package unit of tissues is moved forwardly from the stack 32, the bonds in the lines of severance 263 and 264 will break so as to permit separation of the package unit of sheets from the stack 32. This will result in the formation of a separated, double length package unit 265 as shown in Figure 24 in which insert sheets 18 are embraced in their entireties between folds of the tissue material.

During the upward movement of the pack gripping fingers 218, 220 from starting position shown in Figure 4 to the elevated position shown in Figure 32, the pivoted fingers 218 are in an open position as shown in Figure 4. These fingers 218 are urged by a coil spring 266 (Figure 37) to closed position as shown in Figure 32 but closing of the fingers is controlled by a cam plate 267 which acts against a roller 268 on an arm 269 which depends from one end of the shaft 219 from which the fingers 218 extend upwardly. The said roller 268 initially engages the edge 270 of said cam plate 267 near the lower end of said edge as indicated in Figure 4. During the upward movement of the grippers, said roller 268 rides upwardly along said edge 270 whereby the fingers 218 are held open against the bias of said spring 266. When the grippers reach their elevated position the roller 268 leaves the cam edge 270 thereby permitting the spring to close the fingers 218 into tissue pack gripping position as shown in Figure 32.

As soon as the grippers 218 and 220 have been brought to the pack gripping position shown in full lines in Figure 32, the gripper structure in its closed position is rocked forwardly about the axis of the shaft 223 and it is additionally moved bodily forwardly a short distance to transfer the pack from the position shown in full lines in Figure 32 to the position shown in dotted lines in said figure. For the purpose of rocking the pack grippers the shaft 223 which carries the gripper structure is provided with a gear 271 and this gear meshes with a gear segment 272 formed on one end of an arm 273 which is pivoted as indicated at 274 (Figure 4) on the adjacent arm 224. A cam arm 275 is connected at one end rigidly to the pivoted end of said gear segment arm 273 and the other end of said cam arm 275 is provided with a roller for following the periphery of a cam disc 276 on the said cam shaft 236. The cam 276 is appropriately formed to rock the gear segment arm 273 at the proper time to effect rotary movement of the pack grippers as already indicated.

The cam plate 267 is also rocked downwardly and forwardly slightly to permit the gripper structure to reach the position shown in dotted lines in Figure 32. To that end the said cam plate 267 is carried by the free end of a lever 277 which is rockably mounted at its other end on the pivot shaft 229. A cam lever 278 is rigidly connected at one end to the pivoted end portion of said arm 277 and the other end of said cam lever 278 is provided with a roller which engages the periphery of a cam 279 on said cam shaft 236. This cam 279 is also appropriately formed to rock the cam plate 267 between its normal retracted and raised position as shown in full lines in Figure 32 and its lowered and advanced position as shown in dotted lines in Figure 32. In the arrangement shown the weight of the cam actuated arms and levers is sufficient to maintain the cam following rollers in operative engagement with the cams. However, springs or the like may be provided if desired to maintain the operative relationship between these parts.

The double length pack 265 of interfolded tissues having been delivered to the position shown in dotted lines in Figure 32 is next gripped by the gripper or jaw sets 49 (Figures 1 and 2) each of which comprises an upper jaw 280 and a lower jaw 281 which respectively cooperate with each other to grip the portions of the tissue pack 265 on opposite sides of the line of severance 41. These jaw sets are respectively mounted for rotary movement about pivot shafts 282 to permit the respective jaw sets to be rotated as indicated in Figure 1 from longitudinal alignment to transverse alignment, thereby to separate the sections of the pack on opposite sides of the line of severance 41. These jaw sets are also mounted for horizontal movement along an inclined plane as indicated in Figures 2 and 4 so that said jaws, after gripping the tissue pack may withdraw the tissue pack from the gripper fingers 218 and 220 and advance the pack while separating the same along said line of severance as indicated in Figure 1. The details of the jaw sets 280, 281 and the actuation thereof are not a part of the present invention and therefore will not be described in detail. For present purpose it is sufficient to say that mechanism provided serves to raise and lower the lower jaws 281 to and from pack clamping relationship to the upper jaws 280 and mechanism including a hydraulic cylinder 283 (Figure 4) is provided for shifting the jaw sets in a lateral direction along suitable guide structure provided on the supporting base 284. When the pack 265 is initially delivered to the dotted line position 48 shown in Figure 32, the jaws 280 and 281 are in advanced positions depositing the separated, individual tissue pack units 50 and 51 (Figure 1) on the receiving end of an inclined table 285. From that advanced position the jaw sets 49 are retracted to the position in which they are illustrated in Figures 2, 4 and 32 in which the jaws embrace the pack held in the grippers 218 and 220. The jaws 280 and 281 are of course then in an open position but are automatically closed to grip the pack preliminary to withdrawing it from the said grippers 218, 220. When the jaws 280 and 281 are closed, the gripping fingers 218 are opened incident to an increment of upward movement of the cam plate 267 from a position somewhat below that shown in dotted lines in Figure 32. The cam which controls shifting of said cam plate is of course suitably formed to impart the required indicated movement to the said cam plate 267.

From the initial position in which the packs 50 and 51 are deposited on the table 285 as already explained, the packs are advanced along said table 285 by means of feed fingers 286 (Figure 4) which move in unison with the jaw sets 49. The said fingers 286 advance the separated pack units 50 and 51 into the zone of operation of the mechanism 52 which is provided for adjusting the starter sheet 18 and the overlying tissue fold 261 (Figure 31) so as to place the starter sheet fold or flap 19 in outwardly overlying relation to the tissue fold 261. The tissue fold 261 in the double length pack of tissues 265 of Figure 31, becomes the tissue fold 23 of the single package unit shown in Figure 25.

The mechanism for adjusting each pack in the manner indicated is shown in Figures 33 to 36 inclusive. As there shown, for each pack 50 and 51, there is a long pick-up arm 287 which is pivoted as indicated at 288 on a bracket which extends upwardly from the table plate 285. The pick-up arms 287 are adapted to be rocked about their pivots 288 by means of suitable hydraulic cylinders 289 which have their piston rods pivotally connected as indicated at 290 to portions of the said arms 287. The arms 287 are provided with hollow heads 291 at their free ends and said hollow heads are suitably perforated and connected by passageways indicated at 292 to a passageway in the pivot shaft 288 which through suitable connections (not shown) communicates with a suction pump. As the arms 287 are rocked from the down position illustrated in Figure 33 to the elevated position represented in Figure 35, vacuum is applied to cause said heads 291 to pick up and lift the tissue folds 23 to an open position as represented in said Figure 35. When the arm 287 is in elevated position as shown in Figure 35, a shorter arm 293, pivoted as indicated at 294, is rocked from the full line position shown in Figure 33 downwardly into engagement with the now exposed flap portion 19 of the insert member 18. This arm 293 is provided with a vacuum pick-up head in a manner similar to that illustrated and explained in respect of the arm 287 and when the arm 293 is lowered into engagement with said exposed flap 19 vacuum is applied to cause said flap 19 to be gripped whereupon the arm is rocked to its upwardly disposed position as shown in Figure 35, thereby lifting said flap 19 to an upwardly extending position. The arm 287 is then lowered to replace the tissue fold 23 in place on the tissue stack after which the arm 293 is again lowered to place the insert fold or flap 19 in overlying relation to said tissue fold 23 substantially as shown in Figure 36. The arm 287 is of course preliminarily rocked out of the way of the flap 19 and arm 293 and after the flap 19 is in place as shown in Figure 36 the arm 293 is again elevated leaving the flap 19 in the said overlying position. The control of the vacuum application by the pick-up arms 287 and 293 and the control of the hydraulic cylinders 289 and 295 for rocking the arms 287 and 293 may comprise suitable cam controlled valves or other means (not shown) which are well understood in the art.

After the flap 19 has been adjusted to its outwardly overlapping position, the packs 50 and 51 are advanced by another set of feed fingers 296, from the zone of operation of the mechanism 52 to the gates 53.

The feed fingers 296 are coupled to the feed fingers 286 so as to move in unison therewith. When the fingers 286 feed a pack of tissues into the mechanism 52 which has just been described, the fingers 296 feed a pack of tissues which has just been adjusted by the mechanism 52 from such mechanism to the gates 53. These gates overlie the conveyor 53a and are periodically rocked downwardly to discharge the tissue packs to the said conveyor 53a which carries the packs to mechanism for enclosing the packs in boxes or to other apparatus.

The discharge end portion of the chute which conducts the tissue stack 32 and the mechanism which breaks the pack and adjusts the arrangement of the pull-out sheet on the top face of the tissue pack is disposed at an angle as shown in Figures 2 and 4 in order to carry the packs to an elevation above that of the conveyor 53a which is preferably set at a height convenient to the boxing mechanism. Under other circumstances the pack breaking mechanism and the discharge end portion of the chute for the tissue stack 32 might be horizontally or otherwise positioned.

In the embodiment of the apparatus herein disclosed, the mechanism for feeding, cutting and inserting the pullout and reminder sheets and the mechanism for separating the stack of tissues into package size clips has been designed for application to an already existing rotary interfolding machine. It will, however, be apparent that in apparatus designed in its entirety as a unitary structure, and even in the accessory apparatus as described, many changes could be made in respect of various parts of the mechanism while retaining the principles herein disclosed.

It will also be understood that the invention is not limited to rotary-type interfolding machines or to folding machines which produces S folded tissue sheets. A jaw type interfolding machine such as is disclosed in the Nichol patent, 1,516,779, November 25, 1924, may be used in practicing the invention, and the crepe tissue sheets produced by the chosen sheet folding machine may be Z-folded wherein the folding of the sheets is similar to that shown in Figure 23 with the crepe at right angles to the fold, or any other type fold capable of receiving an insert sheet in accordance with this invention. Furthermore, it will be apparent that having folded the insert sheets into the tissues or the like at predetermined intervals, means other than that described may be used in conjunction with the insert sheets for separating the stack of folded tissues into packs of predetermined size or number of sheets.

In the appended claims, the word "sections" is used to refer (a) to portions of a folded paper web and (b) to portions of a folded insert sheet, which portions are on opposite sides of a fold in the web or sheet, the sections being integrally interconnected by the fold. The word "paper" in the claims is for identification only and is intended to include sheets of material whether or not they are made of paper within the technical meaning of the word "paper". Also, since it is old in the art to incorporate in interfolding apparatus, equipment for breaking the bonds in partially severed webs, for example, as shown in De Loy Pat. 2,420,525, May 13, 1947, the words "paper sheets" are employed in the claims to refer to paper sheets whether they are completely separated from each other or remain interconnected in web form by bonds which are intentionally or unavoidably permitted to remain in the lines of severance produced by the cutting and anvil roll pairs such as 28—26 and 29—27.

We claim:

1. In a machine for forming stacks of folded paper sheets from a continuous web of paper and for intermittently supplying an insert sheet to the paper web, wheeby the stack formed by the machine includes a series of insert sheets each having a portion thereof projecting from the edge of said stack at predetermined intervals therealong, means for conveying the stack of folded paper sheets and projecting insert sheets from the machine, and a pack separating means operable to successively remove the leading pack portion of said stack from the remainder of the stack, said separating means including an element positionable between adjacent folded sheets for supporting engagement with and withdrawal of the leading pack portion of said stack on said conveying means, and detecting means positioned along the path of said conveying means between the stack forming machine and said element and operatively connected with the latter, said detecting means including a part positioned for engagement by the projecting portions of each of said insert sheets to thereby successively initiate movement of said stack separating member into position between the leading insert sheet and the succeeding folded sheet to effect withdrawal of the leading pack portion.

2. In combination with apparatus having means whereby paper sheets are successively fed to folding means, folded, and delivered in folded form into a stack, means for feeding insert sheets successively into positions adjacent certain of said paper sheets and with such paper sheets to said folding means in such relation to the paper sheets that said insert sheets will be folded in unison with the paper sheets and delivered therewith into said stack, timing means for effecting operation of said insert feeding means periodically upon the delivery of predetermined numbers of said paper sheets to said folding mechanism, whereby insert sheets are positioned in the stack at predetermined intervals to provide planes at which such a stack is separable into packageable bundles, and means operative as an incident to the presence of said insert sheets in said stack for successively effecting separation of successively packageable bundles from an end portion of said stack.

3. In combination with apparatus having means whereby paper sheets are successively fed to folding means, folded, and delivered in folded form into a stack, means for feeding insert sheets successively into positions adjacent certain of said paper sheets and with such sheets to said folding means in such relation to said paper sheets that said insert sheets will be folded in unison with the paper sheets and delivered therewith into said stack, said insert feeding means comprising an axially fixed, continuously rotated roller segment, a pressure roller normally spaced from said segment and mounted for movement toward and from the same, and means operatively interconnecting said paper sheet feeding means and said insert sheet feeding means to periodically adjust said pressure roller into sheet feeding relationship to said segment as an incident to the feed of predetermined numbers of said paper sheets to said folding means.

4. In combination with apparatus having means whereby paper sheets are fed successively to folding means, folded, and delivered in folded form into a stack, means for feeding insert sheets successively into positions adjacent certain of said paper sheets and with the paper sheets to said folding means in such relation to the paper sheets that said insert sheets will be folded in unison with the paper sheets and delivered therewith into said stack, said insert feeding means comprising a platform for successively supporting said insert sheets adjacent the path of travel of said paper sheets to said folding means, an axially fixed, continuously rotated roller segment, a pressure roller normally spaced from said segment and mounted for movement toward and from said segment, means operatively interconnecting said paper sheet feeding means and said insert sheet feeding means to periodically adjust said pressure roller into insert sheet feeding engagement with said segment as an incident to the feed of predetermined numbers of said paper sheets to said folding means, said roller segment and said pressure roller being disposed on opposite sides of said platform and the latter being provided with an opening permitting said segment and roller to cooperatively engage and feed said insert sheets as aforesaid.

5. In combination with apparatus having means whereby paper sheets are fed to folding means, folded and delivered in folded form into a stack, means for feeding insert sheets successively into positions adjacent certain of said paper sheets and with such paper sheets to said folding means in such relation to the paper sheets that said insert sheets will be folded in unison with the paper sheets and delivered therewith into said stack, said insert feeding means comprising an axially fixed, continuously rotated roller segment, a pressure roller normally spaced from said segment and mounted for movement toward and from the same, means operatively interconnecting said paper sheet feeding means and said insert sheet feeding means to periodically adjust said pressure roller into feeding relationship to said segment as an incident to the feed of predetermined numbers of paper sheets to said folding means, and a pair of continuously driven, small-diameter rolls located in close proximity to the zone of operation of said folding means and operative to receive the insert sheets from said segment and pressure roll and to continue the feed of said sheets to said folding means.

6. Apparatus comprising means for propelling endwise a stack of sheets having markers inserted in and projecting from the stack at predetermined intervals to define bundles of predetermined numbers of sheets which are adapted to be separated from said stack, means for automatically effecting separation of such bundles successively from the leading end of the propelled stack, and means controlled by said projecting markers for initiating operation of said separating means.

7. Apparatus comprising means for propelling endwise a stack of sheets having markers inserted in and projecting from the stack at predetermined intervals to define bundles of predetermined numbers of sheets which are adapted to be separated from said stack, means for automatically effecting separation of such bundles successively from the leading end of the propelled stack, said means comprising a member which is engageable and movable by said projecting marker portions as an incident to the movement of said markers with said stack, and means operably interconnecting said member and said separating means for initiating operation of the latter as an incident to movement of said member as aforesaid.

8. In combination with apparatus whereby paper webbing is converted into a stack of folded paper sheets so arranged that when a bundle of the sheets is enclosed in a container provided with a suitable dispensing opening, the sheets are successively withdrawable through such opening and withdrawal of each sheet automatically effects withdrawal of a portion of the next sheet to thereby facilitate withdrawal of the successive sheets, means operative to effect incorporation of folded starting sheets in the stack between sections of folded paper sheets in spaced locations in the stack where said stack is to be separated into packageable bundles, means operative to separate said stack at said starting sheets into bundles each containing a starting sheet between the sections of the folded paper sheet on one face of the bundle, and means for adjusting the position of a section of the folded starting sheet from between the sections of said folded paper sheet to exposed position on the outside of the adjacent face of the bundle, another section of said folded starting sheet remaining in place between said folded paper sheet sections, whereby, when the bundle is packaged as aforesaid, the exposed starting sheet section is adapted to provide an edge portion which is accessible within the area of the dispensing opening in the container to facilitate withdrawal of a portion of the first paper sheet from the container.

9. In combination with apparatus comprising means for feeding and folding paper webbing to convert the same into a stack of folded paper sheets so arranged that when a bundle of the sheets is enclosed in a container provided with a suitable dispensing opening, the sheets are successively withdrawable through such opening and withdrawal of each sheet automatically effects withdrawal of a portion of the next sheet to thereby facilitate withdrawal of the successive sheets, means operative to feed starting sheets which are folded on themselves to provide body and end sections into positions adjacent portions of paper webbing and with the latter to said folding means in such relation to the webbing that the body portion of each insert sheet will be folded in unison with the webbing and the insert positioned between sections of a folded paper sheet in the stack with said end section extending inwardly toward the fold formed by said folding means from the fold initially contained in said folded insert sheet, means operatively interconnecting said webbing feed means and said folded insert sheet feed means for effecting periodic operation of the latter as an incident to the feed of predetermined numbers of paper sheet lengths of said webbing to said folding means whereby folded starting sheets will be incorporated in the stack as aforesaid in spaced locations where the stack is to be separated into packageable bundles, means for separating said stack at said insert sheets to form bundles each containing one of said insert sheets between the sections of a folded paper sheet at a face of the bundle, and means for adjusting said end section of the insert sheet from between said paper sheet sections to exposed position on the outside of the bundle.

10. In combination with apparatus comprising means for feeding and folding paper webbing to convert the same into a stack of folded paper sheets so arranged that when a bundle of the sheets is enclosed in a container provided with a suitable dispensing opening, the sheets are successively withdrawable through such opening and withdrawal of each sheet automatically effects withdrawal of a portion of the next sheet to thereby facilitate withdrawal of the successive sheets, means operative to feed insert sheets into positions adjacent portions of the paper webbing and with the latter to said folding means in such relation to the webbing that each insert sheet will be folded in unison with the webbing and incorporated in said stack between sections of a folded sheet, timing means operatively interconnecting said web feeding means and said insert feed means and comprising a pair of devices operative alternately to actuate said insert feed means at unequally spaced successive intervals, whereby said insert sheets are incorporated at successive unequally spaced intervals in said stack, and means for effecting separation of said stack at alternate insert sheets to form paper sheet bundles each containing an insert sheet spaced substantially but unequally from both faces of the bundle and a second insert sheet at one of said faces.

11. In combination with apparatus having means whereby a web of paper which is at least partially severed transversely at longitudinally spaced intervals to define separable sheet portions is fed endwise, folded intermediate the lines of severance, and delivered in folded form in a stack, means for supporting insert sheets adjacent the path of travel of said web to said folding means, means for delivering insert sheets one by one to said supporting means, insert sheets which are folded on themselves so as to provide a body and end sections, intermittently operable means for feeding said folded insert sheets from said supporting means to positions adjacent said web and with said web to said folding means in such relation to said web that the insert sheet will be incorporated in said stack with the body and end portions of the insert disposed in face to face relationship between sections of a folded sheet portion of said web, and means operatively interconnecting said paper web feed means and said insert feed means for effecting intermittent operation of said insert feeding means as an incident to the feed of predetermined numbers of said separable sheet portions of said web to said folding means, whereby said insert sheets are delivered at predetermined intervals into said stack to facilitate separation of said stack into bundles each containing a predetermined number of said separable sheets with one of said insert sheets between a pair of web sections adjacent one face of the bundle, means for automatically effecting separation of the stack into such bundles, and means for automatically effecting adjustment of said insert sheet end portion to exposed, accessible position on the outside of said face of the bundle.

12. In combination with apparatus having means whereby a web of paper which is at least partially severed transversely at longitudinally spaced intervals to define separable sheet portions is fed endwise, folded intermediate the lines of severance and delivered in folded form in a stack, means for supporting insert sheets adjacent the path of travel of said web to said folding means, means for delivering insert sheets one by one to said supporting means, intermittently operable means for feeding said insert sheets from said supporting means to positions adjacent said web and with said web to said folding means, a pair of devices operatively interconnecting said web feed means and said insert sheet feed means and alternately operative to actuate said insert sheet feed means, one of said pair of devices being timed relative to the feed of said paper web to effect feeding of said insert sheets into said folding means so as to effect incorporation of said insert sheets in the stack wholly between sections of a folded sheet portion of the web, the other of said devices being timed to effect relatively delayed feeding of said insert sheets into said folding means so as to effect incorporation of said insert sheets between sections of a folded sheet portion of said web with marginal portions of the insert sheets projecting from a side of the stack so as to constitute accessible markers for facilitating separation of said stack into bundles each containing a predetermined number of said separable sheet portions and a pair of the said insert sheets, one at a face of the bundle and the other in spaced relation to both faces of the bundle.

13. In combination with apparatus having means whereby a web of paper which is at least partially severed transversely at longitudinally spaced intervals to define separable sheet portions is fed endwise, folded intermediate the lines of severance and delivered in folded form in a stack which is moved endwise away from said folding mechanism, means for supporting insert sheets adjacent the path of travel of said web to said folding means, means for delivering insert sheets one by one to said supporting means, intermittently operable means for feeding said insert sheets from said supporting means to positions adjacent said web and with said web to said folding means, a pair of devices operatively interconnecting said web feed means and said insert sheet feed means and alternately operative to actuate said insert sheet feed means, one of said pair of devices being timed relative to the feed of said paper web to effect feeding of said insert sheets into said folding means so as to effect incorporation of said insert sheets in the stack wholly between sections of a folded sheet portion of the web, the other of said devices being timed to effect relatively delayed feeding of said insert sheets into said folding means so as to effect incorporation of said insert sheets between sections of a folded sheet portion of said web with marginal portions of the insert sheets projecting from a side of the stack so as to constitute accessible markers for facilitating separation of said stack into bundles each containing a predetermined number of said separable sheet portions and a pair of the said insert sheets, one at a face of the bundle and the other in spaced relation to both faces of the bundle, and means actuated as an incident to the movement of said projecting marker portions through a predetermined portion of their paths of travel as a part of said stack, for effecting separation of said stack into bundles as aforesaid.

14. Apparatus comprising means for propelling endwise a stack of sheets having separator sheets inserted in said stack at predetermined intervals to define bundles of predetermined numbers of sheets which bundles are adapted to be separated from the leading end portion of said stack, and bundle separating means comprising a member which is mounted adjacent the path of movement of said stack so as to be moveable transversely of the stack opposite the bundle forming leading end portion of the stack and operative as an incident to the presence of the adjacent separater sheet to effect separation of said bundle forming leading end portion of the stack from such stack, and means for effecting such movement of said member.

15. Apparatus comprising means for propelling endwise a stack of sheets having separator sheets inserted in said stack at predetermined intervals to define bundles of predetermined numbers of sheets which are adapted to be separated from said stack, means for automatically effecting separation of such bundles successively from the leading end of the propelled stack, said bundle separating means comprising a member which is mounted adjacent the path of movement of said stack for movement transversely of said stack into the same in a plane which is canted in the direction of stack movement from the point at which said member enters the stack and for additional movement longitudinally of the stack in the direction of movement thereof, whereby a bundle-forming leading end portion of the stack will first be advanced relative to the stack to form a space therein and then separated from the stack, stack supporting means movable transversely of said stack into said space to support said stack when said end portion thereof is being separated from the stack, and means for actuating said member and supporting means.

16. The method of producing packageable bundles of folded paper sheets together with a starting sheet interfolded with the paper sheet on one face of the stack comprising the steps of feeding a succession of paper sheets to means whereby such sheets are folded, collecting the folded paper sheets in a stack and effecting movement of the stack endwise from the zone in which said folding is effected, feeding starter insert sheets into positions adjacent the path of travel of said paper sheets and with the same through said folding means and thence into said stack, said starter sheets being preliminarily folded on themselves and positioned relative to said paper sheets so that the folds in the starter sheets are disposed in the stack at a side thereof, effecting separation of successive, bundle-forming end portions of said stack from the leading end thereof at the successive end-adjacent starting sheets with one of said starting sheets embraced between sections of the folded paper sheet on a face of the bundle, and adjusting a section of the folded starting sheet to exposed position on the adjacent face of the bundle.

17. The method of producing packageable bundles of folded paper sheets together with a starting sheet interfolded with the paper sheet on one face of the stack and a reminder sheet interfolded with folded sheets within the stack in substantially spaced relation to the opposite faces of the stack, comprising the steps of feeding a succession of paper sheets to means whereby such sheets are folded, collecting the folded paper sheets in a stack and effecting movement of the stack endwise from the zone in which said folding is effected, alternately feeding starter and reminder insert sheets in longitudinally spaced relation to each other into positions adjacent the path of travel of said paper sheets to said folding means and effecting movement of such insert sheets with said paper sheets through said folding means and thence into said stack, said starter sheets being preliminarily folded on themselves and positioned relative to said paper sheets so that the folds in the starter sheets are disposed in the stack at a side thereof, effecting separation of successive, bundle-forming end portions of said stack from the leading end thereof at the successive end-adjacent starting sheets with one of said starting sheets embraced between sections of the folded paper sheet on a face of the bundle, and adjusting a section of the folded starting sheet to exposed position on the adjacent face of the bundle.

18. The method of providing a stack of interfolded paper sheets with markers which project from the stack, which comprises the steps of feeding two series of paper sheets to interfolding mechanism whereby the sheets of each series are interfolded with those of the other series and delivered folded and interfolded into a stack, providing insert sheets made of material having sufficient resiliency to cause the same to unfold after the same are folded under the conditions hereinafter set forth, periodically feeding one of such insert sheets into said folding mechanism in such relation to a paper sheet of one of said series as to cause a marginal portion of such insert sheet to be folded in unison with such paper sheet and about a folded edge thereof, whereby, upon discharge of said paper sheet and insert sheet from said folding mechanism, said folded marginal portion of said insert sheet will unfold and project beyond the folded edge of said paper sheet and the corresponding side of said stack.

(References on following page)

References Cited in the file of this patent

UNITED STATES PATENTS

| | | | |
|---|---|---|---|
| 706,262 | Seymour | Aug. 5, | 1902 |
| 950,014 | Boyce | Feb. 22, | 1910 |
| 974,360 | Cottrell | Nov. 1, | 1910 |
| 1,067,026 | Hochner | July 8, | 1913 |
| 1,182,296 | Morden | May 9, | 1916 |
| 1,266,218 | Currie et al. | May 14, | 1918 |
| 2,228,419 | Stern | Jan. 14, | 1941 |
| 2,337,065 | Price | Dec. 21, | 1943 |
| 2,344,022 | Brown | Mar. 14, | 1944 |
| 2,365,645 | Matthews | Dec. 19, | 1944 |
| 2,570,306 | Battersby | Oct. 9, | 1951 |

FOREIGN PATENTS

| | | | |
|---|---|---|---|
| 372,031 | Germany | Mar. 23, | 1923 |